US006752716B1

(12) United States Patent
Nishimura et al.

(10) Patent No.: US 6,752,716 B1
(45) Date of Patent: Jun. 22, 2004

(54) GAME MACHINE FOR SIMULATING VIBRATION

(75) Inventors: Eiji Nishimura, Tokyo (JP); Minoru Matsuba, Tokyo (JP); Motohiko Higashiguchi, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/341,190

(22) PCT Filed: Nov. 6, 1998

(86) PCT No.: PCT/JP98/05014

§ 371 (c)(1),
(2), (4) Date: Aug. 31, 1999

(87) PCT Pub. No.: WO99/24132

PCT Pub. Date: May 20, 1999

(30) Foreign Application Priority Data

| Nov. 7, 1997 | (JP) | 9-306244 |
| Dec. 19, 1997 | (JP) | 9-350392 |
| Apr. 28, 1998 | (JP) | 10-118997 |

(51) Int. Cl.$^7$ .............. A63F 13/00; A63F 9/24; A63F 9/00; G06F 17/00; G06F 19/00; A63B 71/00
(52) U.S. Cl. .................. 463/6; 463/46; 463/36; 463/37; 463/38; 273/148 R; 273/148 B; 434/66; 434/67; 434/69
(58) Field of Search ............ 463/6, 7, 30–35, 463/36, 45, 46, 47, 43, 44, 37, 38, 39; 273/148 R, 148 B, 309; 434/62, 63, 64, 65, 66, 67, 69, 70, 71

(56) References Cited

U.S. PATENT DOCUMENTS

| 1,289,382 A | * | 12/1918 | Brurock ...................... 248/618 |
| 3,423,085 A | * | 1/1969 | Koller et al. .................. 472/99 |
| 3,903,613 A | * | 9/1975 | Bisberg ........................ 434/61 |
| 3,936,955 A | * | 2/1976 | Gruen et al. ................. 35/11 X |
| 4,049,262 A | * | 9/1977 | Cunningham, Jr. .......... 434/61 |
| 4,251,140 A | * | 2/1981 | Fogerty, Jr. ............. 352/132 X |
| 4,262,549 A | * | 4/1981 | Schwellenbach ............ 209/367 |
| 4,276,030 A | * | 6/1981 | Radice ..................... 434/62 X |
| 4,887,967 A | * | 12/1989 | Letovsky et al. ............. 434/61 |
| 4,949,119 A | * | 8/1990 | Moncrief et al. ....... 364/578 X |
| 4,960,117 A | * | 10/1990 | Moncrief et al. .... 273/148 B X |
| 4,978,300 A | * | 12/1990 | Letovsky et al. ............. 434/61 |
| 5,006,072 A | * | 4/1991 | Letovsky et al. ............ 348/121 |
| 5,044,956 A | * | 9/1991 | Behensky et al. ............. 434/45 |
| 5,180,338 A | * | 1/1993 | Pinto ........................ 472/96 X |
| 5,203,563 A | * | 4/1993 | Loper, III ............... 273/148 B |
| 5,232,223 A | * | 8/1993 | Dornbusch ..................... 43/4 |
| 5,299,810 A | * | 4/1994 | Pierce et al. ............. 273/434 X |
| 5,328,410 A | * | 7/1994 | Amburgey et al. ......... 472/103 |
| 5,346,398 A | * | 9/1994 | Nakahata et al. ......... 434/70 X |
| 5,405,152 A | * | 4/1995 | Katanics et al. ......... 273/438 X |
| 5,474,453 A | * | 12/1995 | Copperman ................ 434/29 X |
| 5,542,672 A | * | 8/1996 | Meredith .......................... 43/4 |
| 5,553,148 A | * | 9/1996 | Werle ........................... 381/24 |
| 5,583,844 A | * | 12/1996 | Wolf et al. ....... 364/423.098 X |
| 5,618,178 A | | 4/1997 | Copperman et al. |
| 5,669,818 A | | 9/1997 | Thorner et al. |
| 5,713,792 A | * | 2/1998 | Ohzono et al. ................. 463/7 |
| 5,766,079 A | * | 6/1998 | Kataoka et al. ............... 463/36 |
| 5,785,630 A | * | 7/1998 | Bobick et al. .................. 482/4 |
| 5,823,876 A | * | 10/1998 | Unbehand ................. 463/37 X |
| 5,865,624 A | * | 2/1999 | Hayashigawa ............ 434/66 X |
| 5,885,080 A | * | 3/1999 | Letovsky ................... 434/62 X |
| 5,921,780 A | * | 7/1999 | Myers ....................... 434/69 X |
| 5,951,018 A | * | 9/1999 | Mamitsu ................. 273/442 X |
| 6,217,445 B1 | * | 4/2001 | Inoue ............................ 463/6 |

FOREIGN PATENT DOCUMENTS

| GB | 2 297 274 | 7/1996 |
| JP | 3-97484 | 4/1991 |
| JP | 6-121818 | 5/1994 |
| JP | 7-100266 | 4/1995 |
| JP | 8-276070 | 10/1996 |
| JP | 9-122354 | 5/1997 |
| JP | 9-231008 | 9/1997 |
| JP | 10-10963 | 1/1998 |
| JP | 3046047 | 2/1998 |

OTHER PUBLICATIONS

Konami Kogyo K.K., Microfilm of the specification and drawings annexed to the request of Japanese Utility Model Application No. 25623/1988 (Laid–open No. 130385/1989), 09/98.

Sega Enterprises, Ltd., Microfilm of the specification and drawings annexed to the request of Japanese Utility Model Application No. 47417/1988 (Laid–open No. 150993/1989), 10/89.

Nippon Sangyo K.K., CD–ROM of the specification and drawings annexed to the request of Japanese Utility Model Application No. 87043/1991 (Laid–open No. 29587/1993), 04/93.

Konami Kogyo K.K., Microfilm of the specification and drawings annexed to the request of Japanese Utility Model Application No. 153605/1987 Laid–open No. 59186/1989). 04/89.

* cited by examiner

Primary Examiner—Teresa Walberg
Assistant Examiner—Binh-An D. Nguyen
(74) Attorney, Agent, or Firm—Finnegan, Henderson, Farabow, Garrett & Dunner, L.L.P.

(57) ABSTRACT

It is an object of the present invention to provide a game apparatus which can provide an experience of vibrations similar to a real experience. The game apparatus relating to the present invention executes a game program to display displayed bodies on a screen and comprises means for simulating vibrations generated by the displayed bodies in a state of motion for the player operating the game apparatus.

18 Claims, 25 Drawing Sheets

GAME MACHINE FOR SIMULATING VIBRATION

TECHNICAL FIELD

The present invention relates to a game apparatus, and more particularly to a game apparatus [typo in source], such as a driving game like a car race, which moves objects such as vehicles on a monitor according to player operations, while simulating and transmitting to the player operating this game apparatus the vibrations generated by the displayed bodies in motion.

BACKGROUND ART

Before now such game apparatuses included the driving game noted in Japanese Patent Laid-open No. 8-276070, which is a driving game. This game apparatus comprises a housing with a control apparatus including a handle, accelerator and brake, and the like; the behavior of vehicles displayed on a screen is controlled with the input from these control apparatuses. This game apparatus has a motor on one end of the handle and transmits vibrations [to the player] when the vehicle is struck, for example, by slightly turning the handle side to side (clockwise, counterclockwise) (First conventional art)

This applicant proposed a game apparatus titled Jurassic Park: Lost World. This game apparatus has a vibration generator beneath the player's seat. The game apparatus generates vibrations with the vibration generator according to the circumstances of the objects shown on the screen and transmits the vibrations to the player seated in the chair (Second conventional art).

However, the abovementioned first conventional art provides vibrations simply by turning the handle side to side. A disadvantage of this art is that the player cannot experience realistic vibrations because there is no vibration generator to provide realistic vibrations.

Also, the abovementioned second conventional art does not provide vibrations to the vehicle shown on the screen in a more realistic manner. A disadvantage of this art is that it cannot correctly simulate the vibrations of the objects on the screen which are moving and shaking.

Furthermore, this second conventional art has a single vibration generator beneath the chair. Needless to say, this cannot correctly simulate vibrations because the vibrations are from a single vibration source; [this setup] is far from the case of a real vehicle where passengers experience vibrations which are a synthesis of the vibrations from a plurality of vibration sources.

The abovementioned first conventional art and second conventional art cannot provide the sense of acceleration or of road conditions simply by transmitting vibrations.

Furthermore, the abovementioned first conventional art and second conventional art have the disadvantage that the housing structure is complex and requires many parts. The conventional game apparatuses also have the disadvantage that the player s operations of the control apparatus such as the handle and pedals cannot be observed from outside.

Furthermore, the abovementioned second conventional art has the vibration source installed on the game apparatus by means of a mounting plate. This mounting plate serves as a vibration panel. In other words, the vibration source vibrates the mounting plate, whereby the vibrations are transmitted to the brake pedal and accelerator operated by the player and give the player the sense of operating an actual vehicle. However, a problem with installing the vibration source on the game apparatus by means of a mounting plate is that the vibration of the mounting plate becomes weak when both ends of the mounting plate are attached to the game apparatus and [the player] cannot experience the sensation of driving an actual vehicle.

It is an object of the present invention to provide a game apparatus which can provide the experience of vibrations resembling actual experience and which resolves the problems discussed above. It is another object of the present invention to provide a game apparatus and housing with a simple structure allowing observation of the player's operating the control apparatus.

DISCLOSURE OF THE INVENTION

In order to achieve the abovementioned objects, the game apparatus relating to the present invention is a game apparatus for executing a game program which controls displayed bodies on a screen and which is provided means for simulating and providing to the player operating this game apparatus vibrations generated from the displayed bodies in a state of motion.

Also, the game apparatus relating to the present invention is a game apparatus, for executing a prescribed game according to a game processing program, comprising: means for storing the game program; game processing means for executing prescribed calculations according to the abovementioned program, while forming vibration generation commands according to the game processing situation; a housing for holding a player and a control apparatus for inputting operation commands for the game processing situation; and a vibration generator for generating vibrations according to the vibration generation commands from the game processing means; wherein a plurality of the vibration generators is established in separate locations.

The vibration generators established in separate locations are preferably separated by distances such that their vibrations become identical or similar to actual vibrations. Also, the vibration generators are provided vibration sources and vibration panels for transmitting the vibrations of the vibration sources to the object to be vibrated; it is preferable that one end of the vibration panels be affixed to the object to be vibrated, with the other end remaining open. Also, the vibration panels are preferably provided reinforcing members extending from the open end to the body subject to vibration. The vibration source is preferably a low frequency acoustic vibration source.

Also, the abovementioned housing comprises a seat for the player and a control apparatus established in front of the seat. The vibration generators are preferably established near the control apparatus and the seat. The vibration generators are preferably established beneath the chair or in the seat portion of the chair.

The game apparatus relating to the present invention is a game apparatus for executing a game program controlling displayed bodies on a screen and comprising a control apparatus for the player to provide control signals to the game processing means and a vibration generator for generating vibrations corresponding to the game program. The vibration generator is established in the vicinity of the control apparatus so as to transmit vibrations to the control apparatus. The control apparatus comprises control terminals for the operator; the vibration generator is preferably established at the base of the handle terminal and/or the base of the foot terminal, such as the accelerator.

The game apparatus relating to the present invention is a game apparatus for executing a game program controlling displayed bodies on a screen and comprising: a stationary fixed housing portion; a movable housing portion established rotatably by means of a rotary shaft on this fixed housing portion; and a vibration generator, established at a location separate from the rotary shaft between the fixed housing portion and movable housing portion, for simulating the vibrations of the displayed bodies in a state of motion and providing [those vibrations] to the abovementioned movable housing portion.

The vibration generator has a belt passing around pulleys established on a motor able to turn forward or backwards, auxiliary pulleys, and pulleys connected to braking means. The braking means generate torque according to braking commands provided by the simulation of the vibrations and turn the movable housing portion in the direction of the rotary motion of the belt. The motor therefore turns forwards or backwards according to a forwards or backwards turning command provided by the simulation of the vibrations. The rotary shaft preferably comprises means for continually energizing the movable housing portion in a constant direction.

This game apparatus is a game apparatus, for executing a game program controlling displayed bodies on a screen, comprising a stationary fixed housing portion and a movable housing portion established rotatably via a rotary shaft on this fixed housing portion. [In this game apparatus,] a structural body comprising pipes is established on one end of the abovementioned movable housing portion and a rear structural body comprising pipes is established on the fixed housing portion, at the other end of the movable housing portion. It is preferable that a dashboard and prescribed control apparatus be affixed to the abovementioned structural body and speakers be affixed to the rear structural body.

The housing relating to the present invention is a housing, wherein the player rides and executes the game program by operating attached input devices, comprising pipes which constitute the frame of the housing and netting stretched among the pipes.

The housing relating to the present invention is a housing, wherein the player rides and executes the game program by operating attached input devices, comprising pipes which constitute the frame of the housing and transparent panels mounted among the pipes.

The housing relating to the present invention is a housing, wherein the player rides and executes the game program by operating an attached input device, wherein the frame of the housing comprises flat-sided bodies bracing flat panels.

BEST MODE FOR CARRYING OUT THE INVENTION

First Embodiment

Constitution

Figure 1:
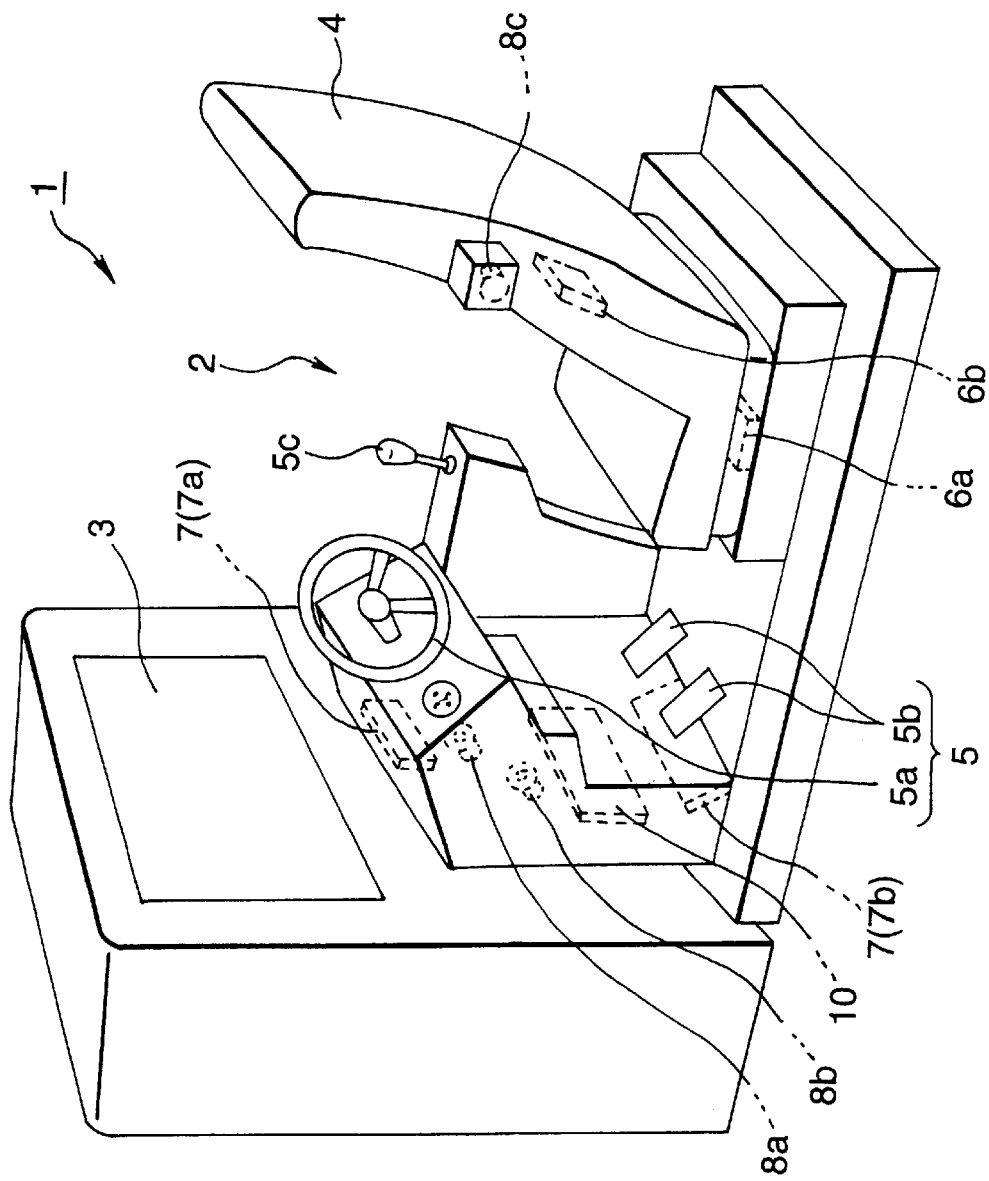
FIG. 1 is a perspective view showing the exterior of a game apparatus relating to the present invention.
Figure 2:
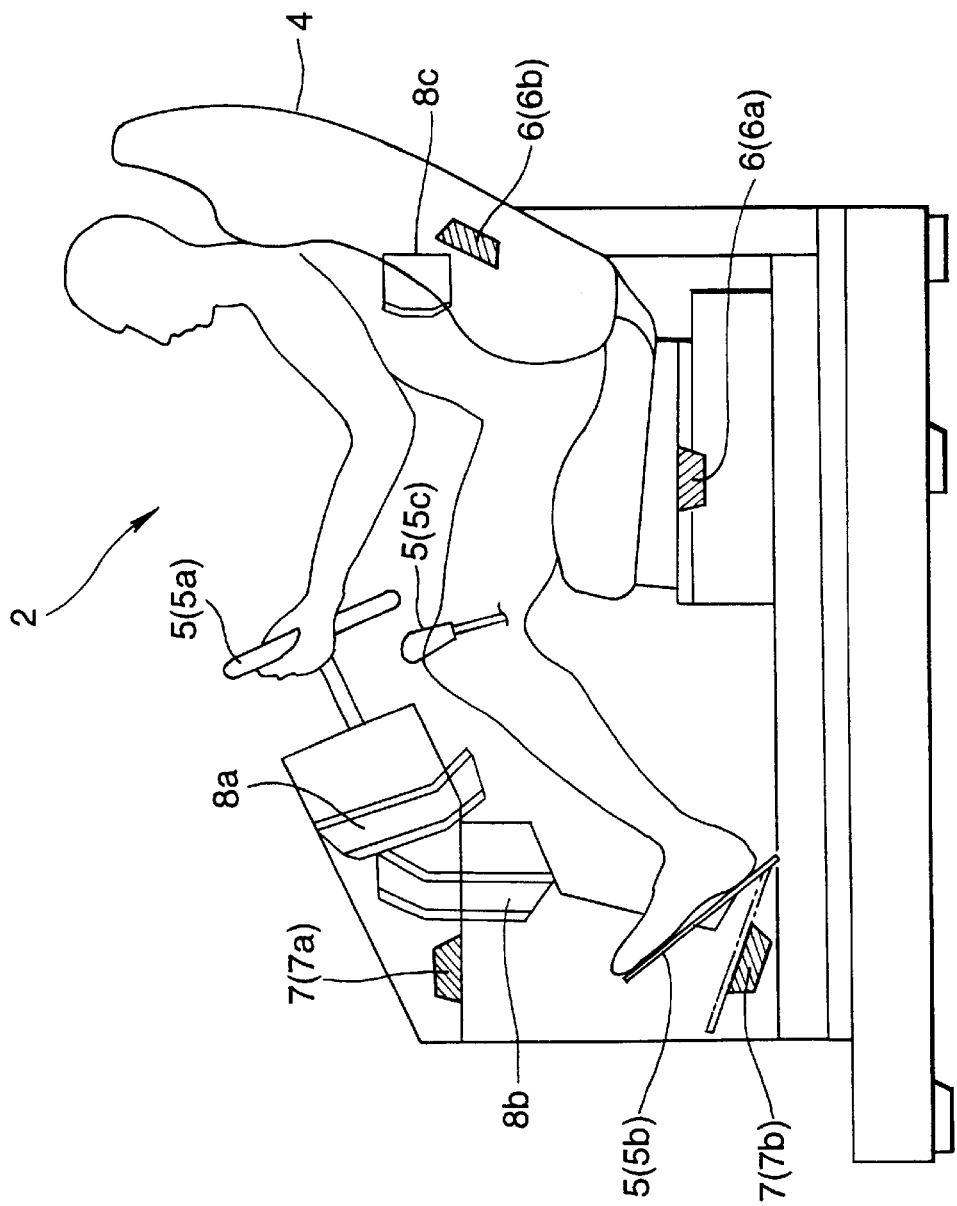
FIG. 2 is a drawing showing a detail of part of the game apparatus relating to the present invention.

FIG. 1 is a perspective view showing a first embodiment of the game apparatus for a driving game relating to the present invention. FIG. 2 is a partial cross section of the housing portion of that game apparatus. In these figures, the number 1 is used to indicate the game apparatus itself. This game apparatus 1 comprises a housing 2 resembling the form of a car driver's seat and a display 3 established in front of this housing 2. This housing 2 comprises a seat 4 in which the player sits and a control apparatus 5 established in front of this chair 4. A vibration generator 6 is established in this chair 4. A vibration generator 7 is also established near the abovementioned control apparatus 5.

The abovementioned vibration generator 6 is divided into a vibration generator 6a and a vibration generator 6b. The vibration generator 6a is established beneath the chair 4, while the vibration generator 6b is established at the location in the chair 4 in contact with the player's hips.

The abovementioned vibration generator 7 is divided into a vibration generator 7a and a vibration generator 7b. The vibration generator 7a is located in the base portion of the handle terminal 5a of the control apparatus 5. The vibration generator 7b is located in the base portion of the foot terminals 5b, such as the accelerator and brake pedal, of the control apparatus 5.

A plurality of these vibration generators 6a and vibration generators 7b is established at separate locations or a plurality of these vibration generators 6b and vibration generators 7a is established at separate locations so that the vibrations are detected at distances closely resembling [the case for] actual vibrations. The player can thereby experience more realistic vibrations.

Figure 24:
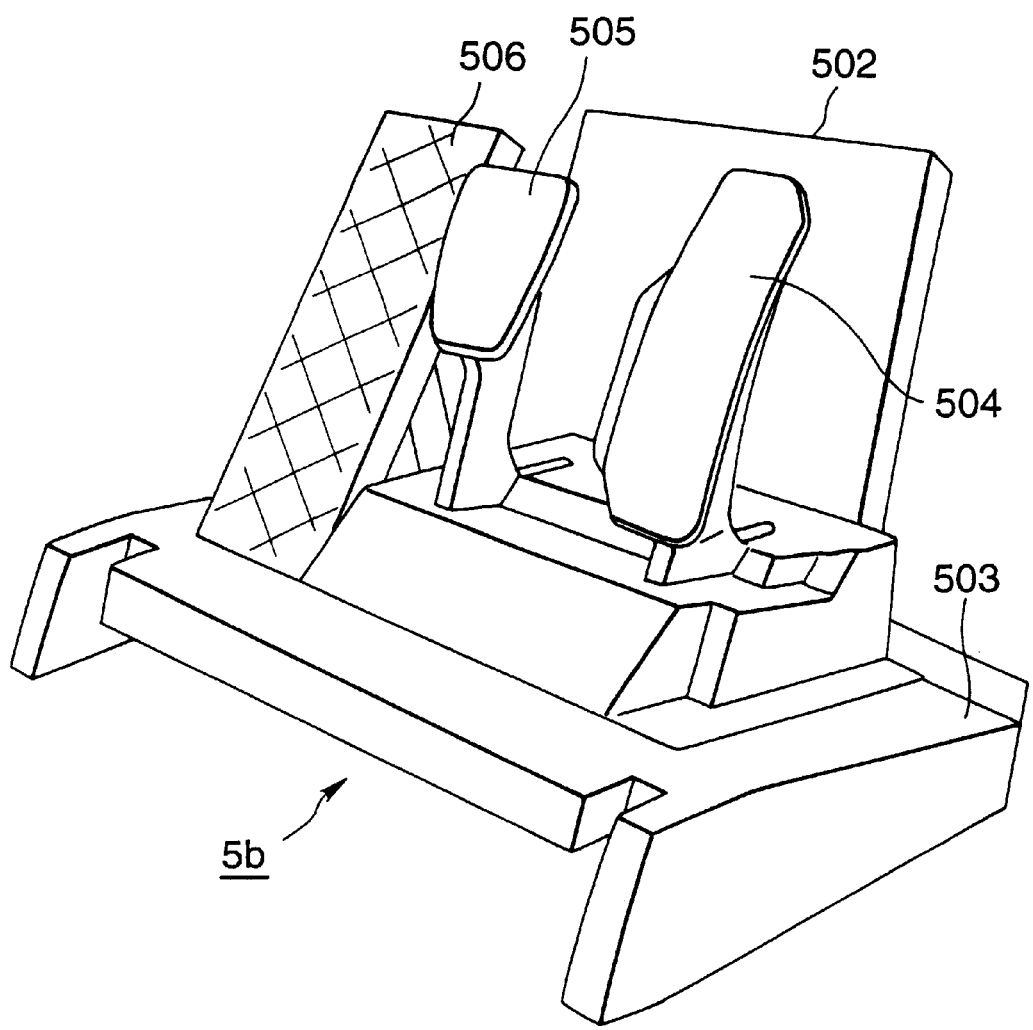
FIG. 24 is a perspective view of the foot terminal.

Next, the vibration generators mounted with the seat and near the accelerator are explained with reference to FIGS. 24 through 26. FIG. 24 is a perspective view of the foot terminals 5b. As shown in the figure, the accelerator 504 and brake pedal 505 are mounted on an accelerator base 503. 506 is a foot panel. The vibration generators shake the accelerator 504, brake pedal 505, accelerator base 503 (bodies subject to vibration), and so forth, on the basis of the situation of the vehicle operated within the virtual space by the player stepping on or withdrawing his or her foot from the accelerator 504 and brake pedal 505. The player can therefore experience the sensation of driving an actual vehicle. The accelerator base 503 is affixed to the game apparatus 1. The vibration source is mounted on the rear surface of the vibration panel 502. The vibration panel 502 is L-shaped; one end of the vibration panel 502 is affixed to the accelerator base 503 (hereafter this end is called the fixed end). The other end is not affixed to the accelerator base 503 and is free (hereafter, this other end is called the open end).

Figure 25:
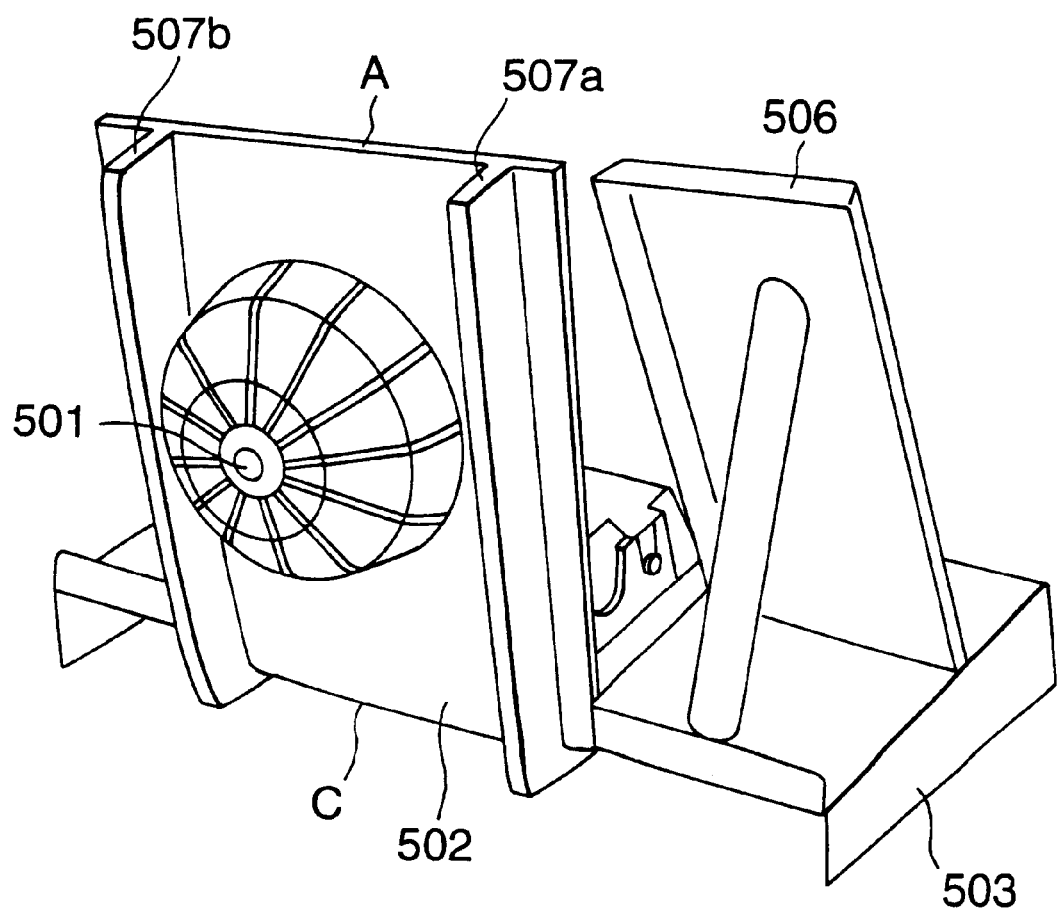
FIG. 25 is a perspective view of the foot terminal as seen from the rear.
Figure 26:
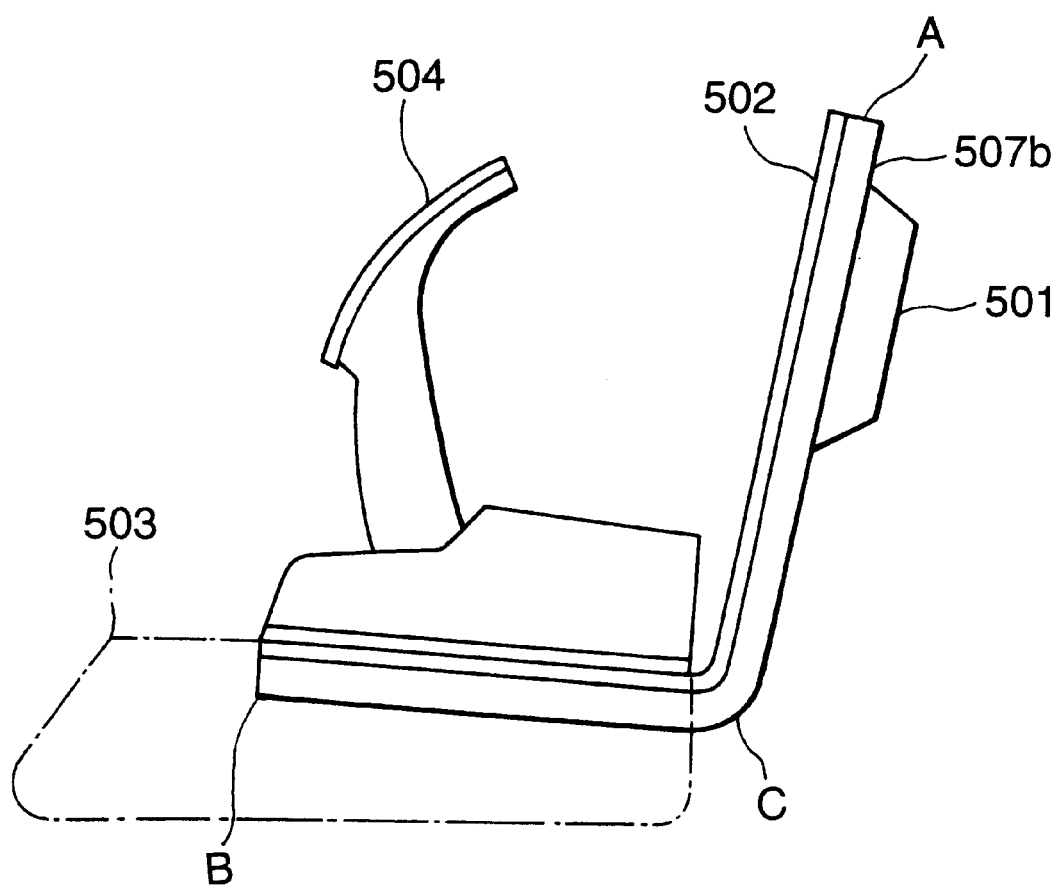
FIG. 26 shows a side view from the right of the foot terminal.

FIG. 25 is a perspective view of the foot terminal 5b as seen from the rear. The vibration source 501 is mounted between the bend C and the open end A of the L-shaped vibration panel 502. Furthermore, on the vibration panel 502, two ribs 507a, 507b are formed lengthwise to the vibration panel 502; in other words, they extend from the vibration source 501 to the accelerator base 503 (bodies subject to vibration). The role of these ribs 507a, 507b is explained with reference to FIG. 26. FIG. 26 is a view from the right of the foot terminal 5b. Because no reinforcing members or the like were used for the vibration panel 502 before now, the vibration panel 502 had low rigidity in the direction in which the vibrations propagated and the vibrations of the vibration panel 502 reached only to the bend C. For this reason, only the open end A oscillated and the vibration did not transfer to the accelerator base 503. Meanwhile, in the vibration generator in the present invention, the ribs 507a, 507b extend in the direction in which the vibration of the vibration panel 502 propagates and increase the rigidity of the vibration panel 502. The vibration of the open end A of the vibration panel 502 is therefore transferred via the bend C to the fixed end B of the vibration panel 502, whereby the accelerator 504 and so forth can be firmly oscillated. Also, the space between the bend C and the fixed end B of the vibration panel 502 is affixed to the accelerator base 503 and the space between the open end A and bend C is in a free state. [This structure] can therefore ensure sufficient vibration energy between the open end A and bend C, while being able to efficient transfer this vibration energy to the accelerator base 503 via reinforcing members such as ribs 507a, 507b.

Moreover, in order to firmly transfer the vibration of the the vibration panel 502 to the accelerator 504 and so forth, the rigidity of the accelerator base 503 is preferably less than that of the vibration panel 502. The vibration panel 502 does not need to be bent in an L-shape and may also be flat. When the vibration panel 502 is flat, the rigidity of the vibration panel in the direction of the vibration may also be increased by folding over the sides of the vibration panel 502, as well as forming ribs as reinforcing members for the vibration panel 502. The vibration source 501 is preferably a low-frequency acoustic vibration source. For example, the 130-5172" transducer from the AURA Co. (sold by Kaga Electronics Co., Ltd.) can be used.

Figure 27:
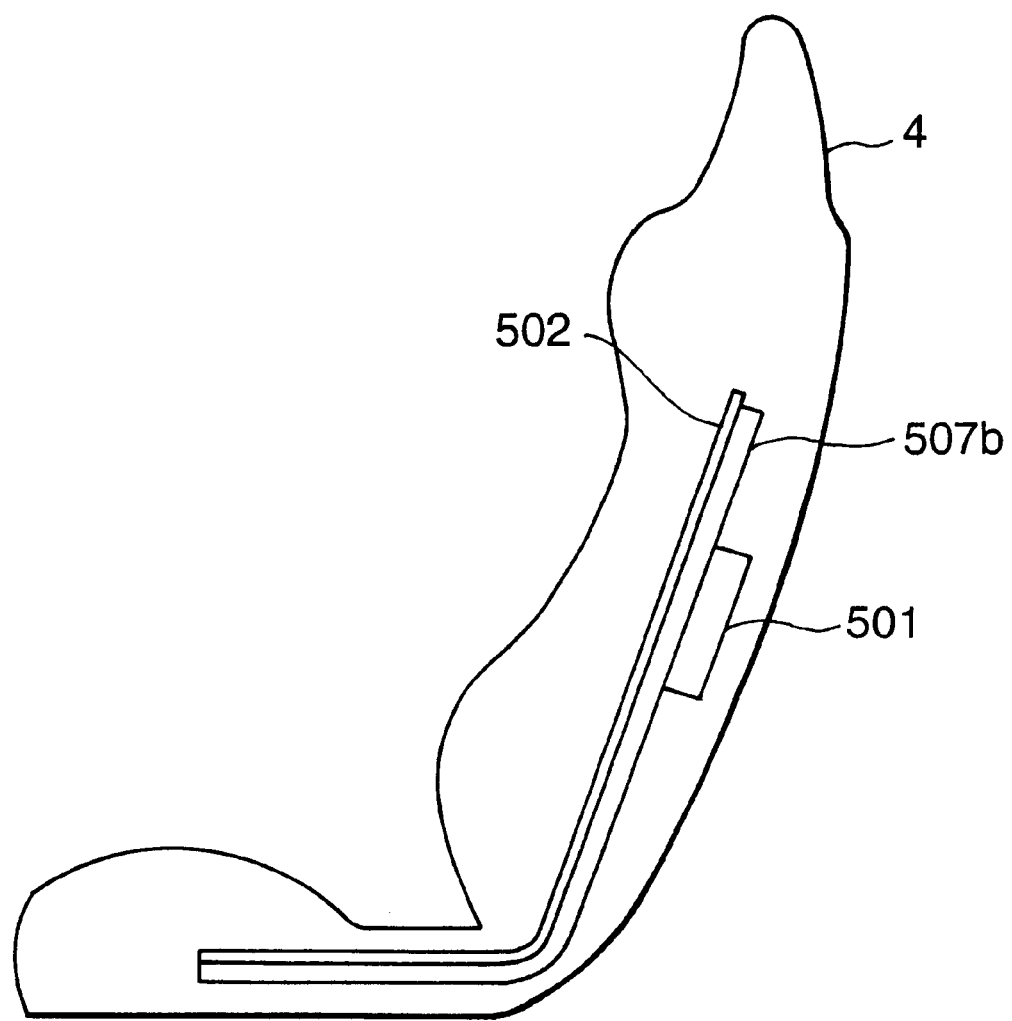
FIG. 27 is a drawing to explain the vibration generator mounted within the seat.

Mounting the vibration generator of the present invention within the seat results in the situation shown in FIG. 27. The constitution of the vibration source 501 and vibration panel 502 are the same as shown in FIGS. 24 through 26. With the constitution shown in FIG. 27, the player can directly feel the vibrations in the back of the seat as well as the vibrations in the seat area. Consequently the game becomes more interesting because the player can experience more realistic vibrations.

As shown in FIGS. 1 and 2, speaker mounting holes are established on both sides of the front of the housing 2 where the control apparatus 5 is installed. A speaker 8a for background music and a speaker 8b for sound effects are placed within these holes. Also, speaker boxes are established on both sides of the chair 4 of the housing 2 and speakers 8c for sound effects are placed within these speaker boxes.

Moreover, a shift lever 5c is established on the housing 2 and a view change switch, various instruments, lights, and the like are established, but not shown, beside the handle terminal 5a. The game processing board 10 and other circuitry is established within the housing 2.

Figure 3:
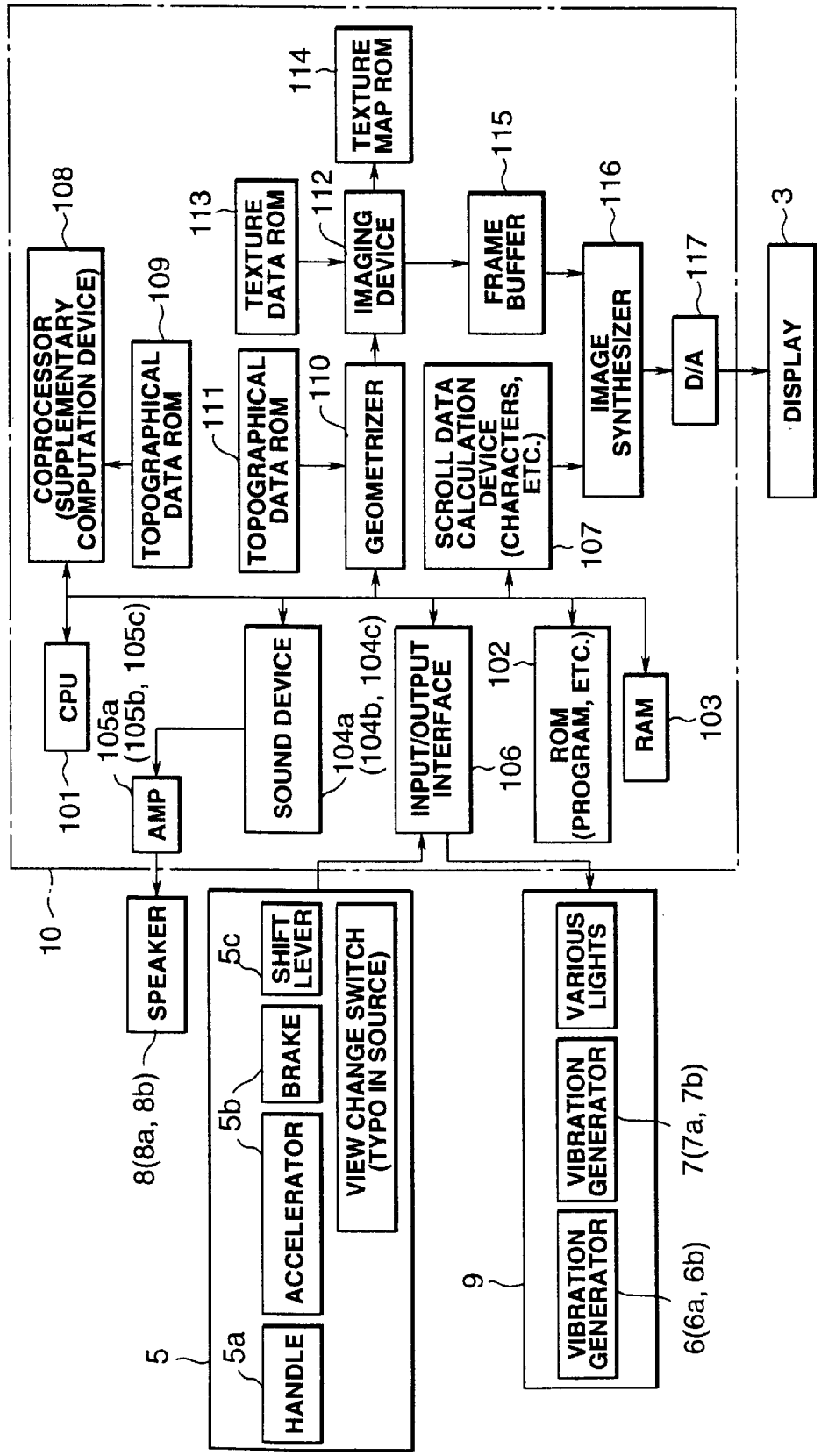
FIG. 3 is a block diagram of the circuit for executing the game processing for the game apparatus relating to the present invention.

FIG. 3 is a block diagram of the game apparatus relating to the present embodiment. This game apparatus is basically provided a display 3, control apparatus 5, output apparatus 9 comprising various types of lights and instruments and the vibration generators 6, 7, and speakers 8.

The game processing board 10 comprises the following: CPU (central processing unit) 101, ROM 102, RAM 102, RAM 103, sound device 104, input/output interface 106, scroll data computer 107, coprocessor (auxiliary processing unit) 108, topographic data ROM 109, geometrizer 110, shape data ROM 111, plotter 112, texture data ROM 113, texture map RAM 114, frame buffer 115, image synthesizer 116, and digital/analog converter 117.

The CPU 101 is connected to the following via a bus line: the ROM 102 storing prescribed programs and image processing programs, RAM 103 storing data, sound devices 104a 104c, input/output interface 106, scroll data computer 107, coprocessor 108, and geometrizer 110. RAM 103 functions as a buffer to which are written various commands for the geometrizer (such as display object) and necessary data during various calculations.

The input/output interface 106 is connected to the view change switch, shift lever 5c, foot terminal 5b, and handle terminal 5a of the abovementioned control apparatus 5. The operations signals of the shift lever 5c, foot terminal 5b, handle terminal 5a, and so forth, of the control apparatus 5 are thereby input as digital values to the CPU 101. The output apparatus 9 is connected to the input/output interface 106 as well, whereby the vibration generators 6a, 6b, 7a, and/or 7b in the output apparatus 9 are operated according to vibration commands from the CPU 101. Additionally, the control apparatus 5 and/or the seat 4 of the housing 2 are thereby operated according to the contents of the game.

The sound devices 104a, 104b, 104c are connected to speakers 8a, 8b, 8c respectively by electronic amplifiers 105a, 105b, 105c. The acoustic signals individually generated by sound devices 104, 104b, 104c are electronically amplified and then provided to speakers 8a, 8b, 8c.

On the basis of programs stored in ROM 102 as a storage medium, the CPU 101 in the present embodiment reads the following and at a minimum computes behavior (simulation) and special effects: operation signals from the control apparatus 5, graphic data from the graphic data ROM 109, or motion data (three-dimensional data such as characters like the enemy and background like topography, sky, and various structures) from the motion data ROM 111. The behavior calculations simulate the actions of the enemy within virtual space. After determining coordinates within three-dimensional space, [the CPU 101] indicates the conversion matrix to convert these coordinates to the coordinate system of the field of view and shape data (polygon data) to the geometrizer 110.

The shape data ROM 109 is connected to the coprocessor 108. Consequently, the shape data, determined in advance, shifts to the coprocessor 108 (and CPU 101). The coprocessor 108 mainly takes on floating point calculations. As a result, various decisions are executed by the coprocessor 108; the results of those decisions are provided to the CPU 101, thereby reducing the load on the CPU.

The geometrizer 110 is connected to the motion data ROM 111 and plotter 112. As discussed above, shape data (three-dimensional data such as background, topography, and characters composed of vertexes) comprising a plurality of polygons are stored in advance in the motion data ROM 111. This shape data is transferred to the geometrizer 110. The geometrizer 110 performs perspective conversion for the shape data indicated with the conversion matrix sent from the CPU 101 and attains data converted from the coordinate system in three-dimensional virtual space to the field of view coordinate system.

The plotter 112 adds texture to the shape data converted to the field of view coordinate system and outputs this to the frame buffer 115. For the application of this texture, the plotter 112 is connected to the texture data ROM 113 and texture map RAM 114, as well as the frame buffer 115.

Moreover, polygon data refers to a data group of relative or absolute coordinates of the vertexes of a polygon (polygon: mainly three- and four-sided figures) comprising a group of vertexes. The abovementioned shape data ROM 109 stores the relatively rough polygon data sufficient for executed the prescribed judgements.

On the other hand, the motion data ROM 111 stores the more precise polygon data relating to the shapes composing the screen, such as the background and enemy [characters].

The scroll data computer 107 calculates the data (stored in ROM 102) for the scrolling screen, such as character [data]. This computer 107 and the abovementioned frame buffer 115 are connected to the display 1a via the image synthesizer 116 and D/A converter 117. The scrolling screen of necessary character information and the polygon screen (simulation results), such as topography (background) and enemy [characters], temporarily stored in the frame buffer 115, are thereby synthesized according to the indicated priority and the final frame image data are generated. This image data is converted to an analog signal with the D/A converter 117 and sent to the display 1a, where the game images are displayed in real time.

Main Processes

Figure 4:
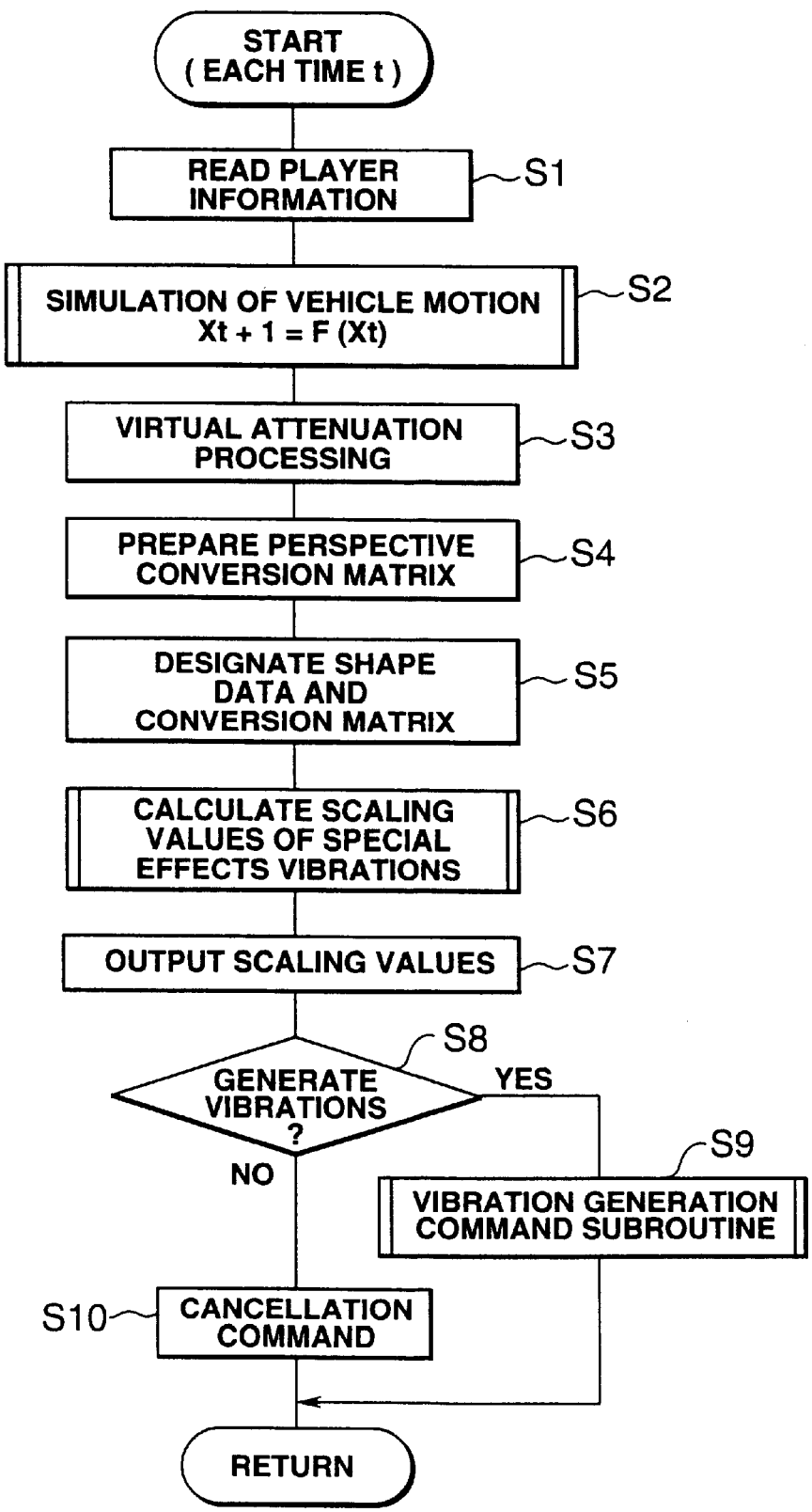
FIG. 4 is a flow chart showing the main processing for the game apparatus relating to the present invention.
Figure 5:
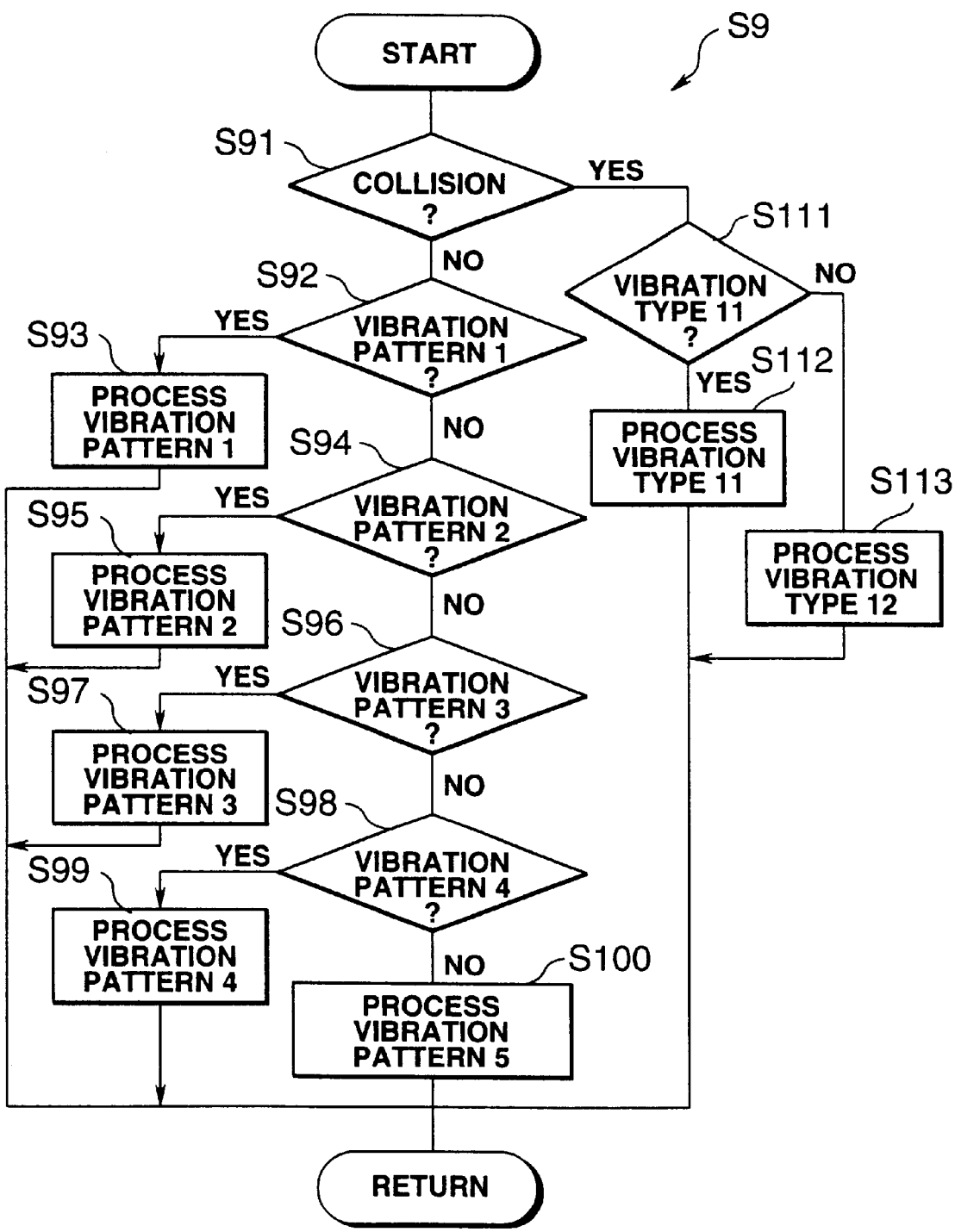
FIG. 5 is a flow chart showing the subroutine for the game apparatus relating to the present invention.

The operation of the game apparatus relating to the present embodiment is explained. FIG. 4 shows the main routine of the game process relating to the present embodiment. This main routine is executed at each time t. The main CPU 101 performs the calculations for vehicle behavior and for the background and vibrations, generated as special effects according to the behavior of the vehicle.

Moreover, the calculations for vehicle behavior include determining the situation of the vehicle hitting topographical [features] and collisions between vehicles, as well as calculations for the behavior of the 4-wheeled suspension.

When the game apparatus starts up, the CPU 101 takes up control information from the control apparatus 5 operated by the player, such as the angle of the handle terminal 5a and the opening of the accelerator in the foot terminal 5b, for example, as digital values via the input/output interface 106 (step (s) 1). Then the CPU 101 executes a simulation (dummy driving) of the movement of the vehicle on the basis of that control information (S2). Also, the CPU 101 repeatedly executes steps S1 and S2 and displays [the results] on the display 3, thereby simulating the vehicle as operated by the player. However, when [this simulation] is applied to the game without further processing, the behavior of the vehicle becomes too sensitive, making operation of the vehicle difficult. [The CPU 101] therefore performs virtual attenuation processing (S3) and the behavior of the vehicle becomes more similar to that of a real vehicle.

Furthermore, the CPU 101 generates a perspective conversion matrix for carrying out perspective conversion of the three-dimensional shape data into the field of view coordinate system. [The CPU 101 then] provides this matrix, along with the shape data, to the abovementioned geometrizer 110 via the RAM 103 (S4, S5). As special effects for the driving game in the present embodiment, the CPU 101 monitors the behavior of the vehicle which is currently displayed and determines whether the vehicle should vibrate (S8). When the CPU 101 determines that the vehicle should vibrate (S8: YES), it shifts to the subroutine in step 9, provides the vibration generation command matching the vibration details to the vibration generator 6 and/or vibration generator 7, and escapes the process.

Moreover, the basis for determining whether vibrations are generated includes whether the tires are smooth, great force is applied to the suspension, the front wheels lock up during braking, a collision occurs, or the like. Also, upon passing through the abovementioned subroutine, the vibration generation command is output from the input/output interface 106 until the release command is provided.

Meanwhile, when the CPU 101 determines that the vehicle does not vibrate (S8: NO), [the CPU 101] outputs the vibration release command (S10), and escapes the process.

Moreover, when no vibrations are to be generated, the vibration release command is continually output from the input/output interface 106 and the vibration generators 6, 7 do not operate.

Subroutine Process

The CPU 101 determines whether the vehicle vibrates based on the results of vehicle behavior calculations in step S2 (S8) When it is determined that the vehicle vibrates (S8: YES), the subroutine in step S9 is called.

Upon starting the subroutine in step S9, the CPU 101 determines whether the vibrations are due to a collision or some other vehicle behavior (S91).

Vibrations Due to Other Behavior

When the CPU 101 determines that the vehicle behavior is due to some other vibration (S91: NO), [the CPU 101] determines the vibration type (S92).

Vibration Type 1

When the CPU 101 decides upon vibration type 1 (S92: YES), [the CPU] shifts to the following process. The vibration type 1 reflects the situation where the vehicle jumps upon driving over a rise in the road surface and lands on the front wheels, for example.

Figure 6A:
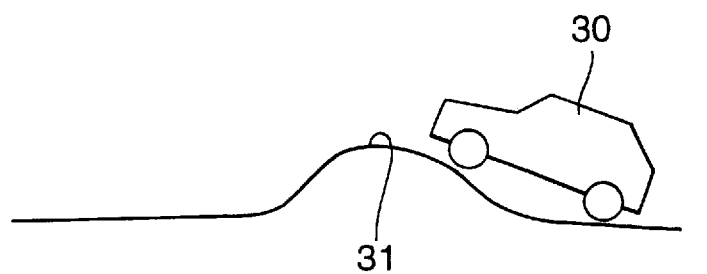
FIG. 6 is a drawing for explaining the operation of the vibration pattern 1 of the game apparatus relating to the present invention.
Figure 6B:
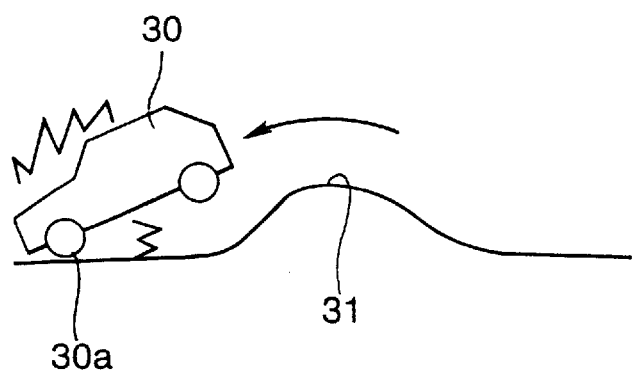
Figure 7:
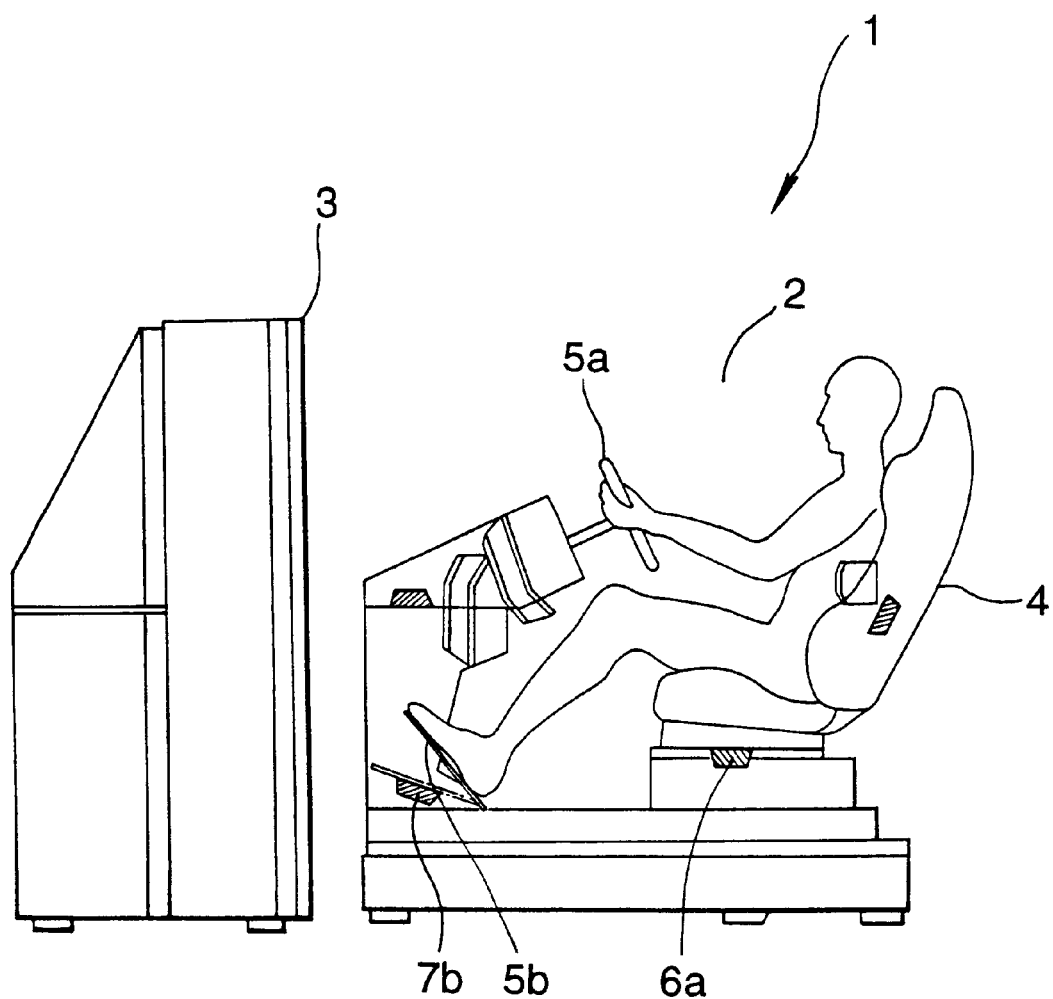
FIG. 7 is a drawing showing an example of the vibration generator which receives the vibration generation command in the game apparatus relating to the present invention.

When the CPU 101 decides upon vibration type 1 (S92: YES), the CPU 101 computes the situation wherein the vehicle 30 begins to drive over the rise in the road surface 31 as shown in FIG. 6(*a*) at time t1. The CPU 101 provides the vibration generation signal to the vibration generator 7*b* shown in FIG. 7 via the input/output interface 106 at this time t1 (S93).

In this case, the CPU 101 pulls the vibration generation command which best reflects the current conditions of the vehicle from a table of vibration generation commands corresponding to vehicle conditions stored in advance in the ROM 102, for example. Consequently, the player experiences vibrations as if the front [of the vehicle] were lifted.

When the main routine is executed at each time t, the subroutine in step S9 is called and steps S91, S92, and S93 are processed, whereby the vehicle rides further up on the raised portion of the road surface and begins to jump. At this time, the CPU 101 pulls the vibration generation command corresponding to those conditions from the abovementioned table and provides [the command] to the vibration generator 7*a* via the input/output interface 106. As a result, the player can experience vibrations as if [the vehicle] were jumping from the state where its front is lifted.

When the main routine is executed at each time t, the subroutine in step S9 is called and steps S91, S92, and S93 are processed. Thereupon, at time t2, the vehicle 30 lands on the road surface beginning with its front wheels 30*a* as shown in FIG. 6(*b*). At this time, the CPU 101 pulls the optimum vibration generation command based on vehicle conditions from the abovementioned table and provides the vibration generation command to the vibration generator 6*a* shown in FIG. 7 via the input/output interface 106. The chair 4 is thereby vibrated as if it were being lifted and the player can experience vibrations as if the vehicle were landing on the ground.

Vibration Type 2

When the CPU 101 decides upon vibration type 2 (S9: NO, S94: YES), [the CPU] transfers to the following process. Here, the vibration type 2 reflects the state where the front and rear wheels of the vehicle successively pass over a bump, for example.

Figure 8A:
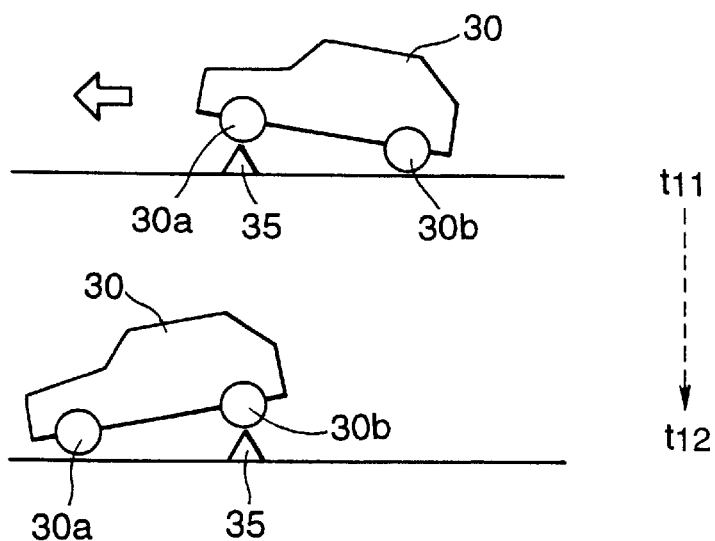
FIG. 8 is a drawing for explaining the operation of the vibration pattern 2 of the game apparatus relating to the present invention.
Figure 8B:
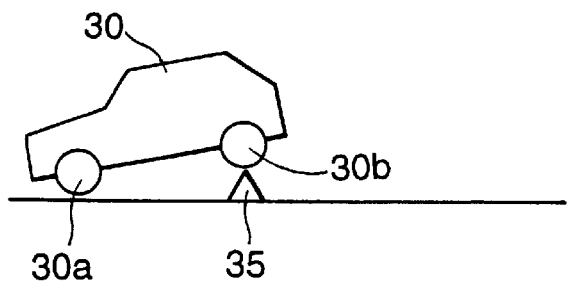

When the CPU 101 decides that vibration type 1 is not [appropriate] (S92: NO) and decides upon vibration type 2 (S94: YES), the CPU 101 calculates the situation wherein the vehicle 30 drives onto the bump 35 as shown in FIG. 8(*a*) at time t11. At this time t11, the CPU 101 pulls the vibration generation command corresponding to the vehicle situation from the table and provides that vibration generation command to the vibration generator 7*b* shown in FIG. 7 via the input/output interface 106 (S95). As a result, the player can experience vibrations as if the front wheels were passing over a bump.

When the main routine is executed at each time t, the subroutine in step S9 is called and steps S91, S92, S94, and S95 are processed, whereby the vehicle finishes passing over the bump 35.

When the main routine is then executed at each time t, the vibrations disappear because the bump is passed over (S8: NO) and the vibration generation command is canceled (S10). As a result, the player experiences the situation where the [vehicle] is level after the front wheels pass over the bump and before the rear wheels reach the bump.

Also, when the main routine is then executed at each time t, the CPU 101 calls the subroutine in step S9 when the rear wheels 30*b* of the vehicle 30 ride over the bump 35 as shown in FIG. 8(*b*) (S8: YES) and executes steps S91, S92, S94, and S95.

At time t12, the rear wheels 30*b* of the vehicle 30 are on the bump 35 as shown in FIG. 8(*b*). At that time, the CPU 101 references the table and pulls the most appropriate vibration generation command for the vehicle conditions based on the abovementioned vehicle conditions. [The CPU 101 then] provides that vibration generation command to the vibration generator 6*a* shown in FIG. 7 via the input/output interface 106. The seat 4 is thereby vibrated as if it were rising upwards and the player experiences vibrations as if the rear wheels of the vehicle were passing over a bump.

Moreover, the transition of the processing from time t11 to time t12 is made fast or slow depending on the speed of the vehicle 30.

Vibration Type 3

When the CPU 101 decides upon vibration type 3 (S92: NO, S94: NO, S96: YES), [the CPU] transfers to the following process. Here, the vibration type 3 reflects the state where the front wheels lock up when the vehicle is braked.

Figure 9:
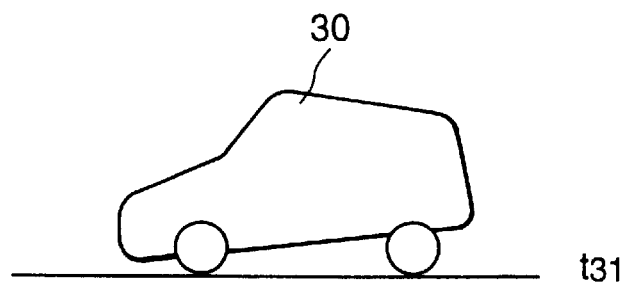
FIG. 9 is a drawing for explaining the operation of the vibration pattern 3 of the game apparatus relating to the present invention.

When the CPU 101 decides that vibration types 1 and 2 are not [appropriate] (S92: NO, S94: NO) and decides upon vibration type 3 (S96: YES), the CPU 101 has the vehicle 30 braking as shown in FIG. 9 and the front wheels 30*a* locking up at time t21. The CPU 101 references the abovementioned table based on the conditions of the abovementioned vehicle 30 at time t31 and pulls the most appropriate vibration generation command for the conditions of the vehicle 30. [The CPU 101 then] provides that vibration generation command to the vibration generator 7*b* shown in FIG. 7 via the input/output interface 106 (S97). As a result, the player can experience vibrations as if the front wheels locked up during braking.

Vibration Type 4

When the CPU 101 decides upon vibration type 4 (S92: NO, S94: NO, S96: NO, S98: YES), [the CPU] transfers to the following process. Here, the vibration type 4 reflects the state where the vehicle is drifting.

Figure 10:
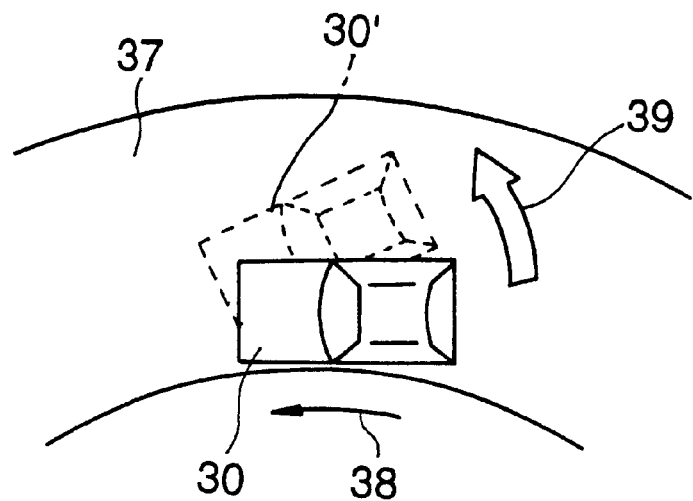
FIG. 10 is a drawing for explaining the operation of the vibration pattern 4 of the game apparatus relating to the present invention.

When the CPU 101 decides that vibration types 1, 2, and 3 are not [appropriate] (S92: NO, S94: NO, S96: NO) and decides upon vibration type 4 (S98: YES), the CPU 101 calculates the situation when the vehicle 30 is traveling in the direction shown by the arrow 37 through a curve of the road 37 as shown in FIG. 10, and the rear wheels of the vehicle 30 drift as shown by the arrow 39 so that the vehicle becomes as shown with the vehicle 30'. The CPU 101 references the abovementioned table based on the conditions of the vehicle at this time and pulls the most appropriate vibration generation command for the conditions of the vehicle. [The CPU 101 then] provides that vibration generation command to the vibration generator 6*a* shown in FIG. 7 via the input/output interface 106 (S99). As a result, the player can experience vibrations as if the vehicle were drifting in a curve.

Vibration Type 5

When the CPU 101 decides upon vibration type 5 (S92: NO, S94: NO, S96: NO, S98: NO), [the CPU] transfers to the following process. Here, the vibration type 5 reflects the state where the rear wheels of the vehicle are spinning to no effect.

Figure 11:
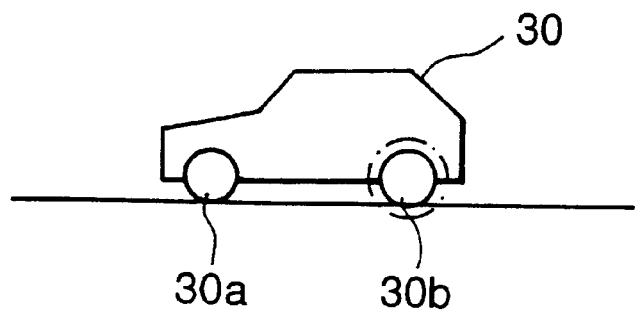
FIG. 11 is a drawing for explaining the operation of the vibration pattern 5 of the game apparatus relating to the present invention.

When the CPU 101 decides that vibration types 1, 2, and 3 are not [appropriate] (S92: NO, S94: NO, S96: NO) and that vibration type 4 is not either (vibration type 5), the CPU 101 calculates the situation when the rear wheels 30b of the vehicle 30 are spinning as shown in FIG. 11. The CPU 101 references the abovementioned table based on the conditions of the vehicle at this time and pulls the most appropriate vibration generation command for the conditions of the vehicle. [The CPU 101 then] provides that vibration generation command to the vibration generator 6a shown in FIG. 7 via the input/output interface 106 (S100). As a result, the player can experience vibrations as if the vehicle s wheels were spinning.

In this way, the state of the vehicle and road conditions displayed on the screen of the display 3 can be transmitted to the player through the use of the vibration generators 6, 7 separately and according to changes in the road surface.

Vibrations Due to Collisions

Upon calling the subroutine in the abovementioned step S9, the CPU 101 decides the vibrations are due to a collision [based on] vehicle behavior (S91: YES) and then determines the type of collision (S111).

Vibration Type 11

When the CPU 101 decides upon the vibration type 11 (S91: YES, S111: YES), [the CPU] transfers to the following process. Here, the vibration type 11 reflects the state where the vehicle collides with an object to the front thereof.

Figure 12:
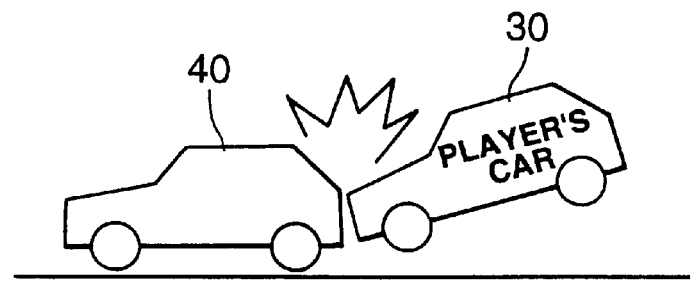
FIG. 12 is a drawing for explaining the operation of the vibration pattern 11 of the game apparatus relating to the present invention.

When the CPU 101 decides upon vibration type 11 (S111: YES), the CPU 101 calculates the situation where the vehicle 30 collides with another object (a vehicle 40 in this case) to the front thereof as shown in FIG. 12. The CPU 101 references the abovementioned table based on the conditions of the vehicle collision at this time and pulls the most appropriate vibration generation command for the conditions of the vehicle collision. [The CPU 101 then] provides that vibration generation command to the vibration generator 7a shown in FIG. 13 via the input/output interface 106 (S112).

As a result, the player can experience vibrations as if the vehicle 30 were colliding with another vehicle 40 to the front thereof.

Vibration Type 12

When the CPU 101 decides upon the vibration type 12 (S91: YES, S111: NO), [the CPU] transfers to the following process. Here, the vibration type 12 reflects the state where the vehicle is struck from the rear by another object (such as the vehicle 40) or strikes another object (such as the vehicle 40) to the rear thereof.

When the CPU 101 decides upon vibration type 12 (S111: NO), the CPU 101 calculates the situation where the vehicle 30 is struck from the rear by another object (here, the vehicle 40), or where the vehicle 30 is moving backwards and strikes another object (vehicle 40). The CPU 101 references the abovementioned table based on the conditions of the vehicle collision at this time and pulls the most appropriate vibration generation command for the conditions of the vehicle collision. [The CPU 101 then] provides that vibration generation command to the vibration generator 6b shown in FIG. 7 via the input/output interface 106 (S113).

As a result, the player can experience vibrations as if the vehicle 30 were being struck by another vehicle 40 or if the vehicle 30 were backing up and colliding with another vehicle 40.

As a result, the player can experience vibrations as if the vehicle 30 were being struck from the rear by another vehicle 40 or as if the vehicle 30 were striking another vehicle 40 from the rear.

In the case of vibration types 11 and 12 due to collisions, the sense of the vehicle being struck by an outside [object] is transmitted to the player.

Moreover, with the abovementioned vibration types due to other behaviors or vibration types due to collisions, the CPU 101 refers to the abovementioned table based on the vehicle conditions and pulls the vibration generation command most appropriate for the vehicle conditions. [The present invention is] not limited to this, however, and [the CPU 101] may also calculate at that time the best vibration generation command based on vehicle conditions.

The abovementioned vibration types were explained where there were five vibration types 1 5 due to other behaviors and two vibration types 11 and 12 due to collisions. [The present invention] is not limited to these numbers and may employ other vibration types.

Other Operations

Engine vibrations can be realized by inputting vibrations matched to engine noise to the vibration generators 6, 7, along with the abovementioned vibration types 1 5 due to other vehicle conditions and vibration types 11, 12 due to collisions. In this case, either of the vibration generators 6, 7 may be used. More complex vibrations can be transferred to the player through the use of both the vibration generator 6 and the vibration generator 7.

Moreover, the 130-5172" transducer from the AURA Co. (sold by Kaga Electronics Co., Ltd.) can be used as the vibration generator. In addition to those mentioned above, the storage media may include other storage means, such as other known media like hard disks, cartridge ROM, and CD-ROMs, as well as telecommunications media (Internet, other personal computer networks, and information on the servers thereof).

Furthermore, one or more vibration generators can be made mobile so that the distances between the plurality of vibration generators located at separate positions can be made longer or shorter. Affixing the vibration generators to moving mechanisms, such as linear guides, ball screw devices, and the like may be considered. The vibrations generated can be made more realistic because the distances among the vibration generators can be varied thereby. Such a constitution includes a vibration detection device for detecting current vibrations of the housing of the game machine.

Second Embodiment

Next, the second embodiment of the driving game apparatus relating to the present invention is explained with reference to FIGS. 15 through 22.

Constitution

Figure 15:
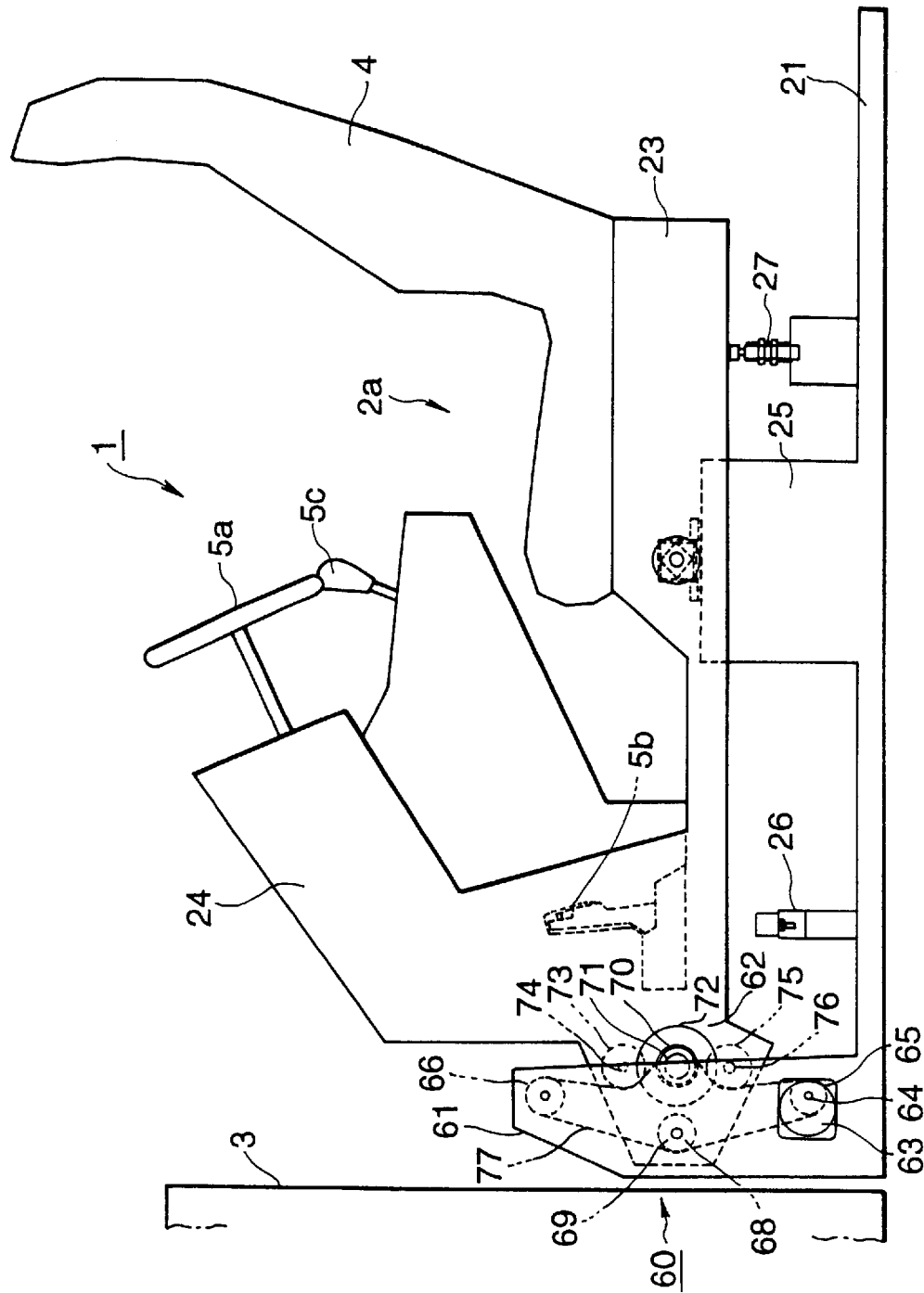
FIG. 15 is a side view showing the housing portion of the game apparatus relating to the present invention.
Figure 16:
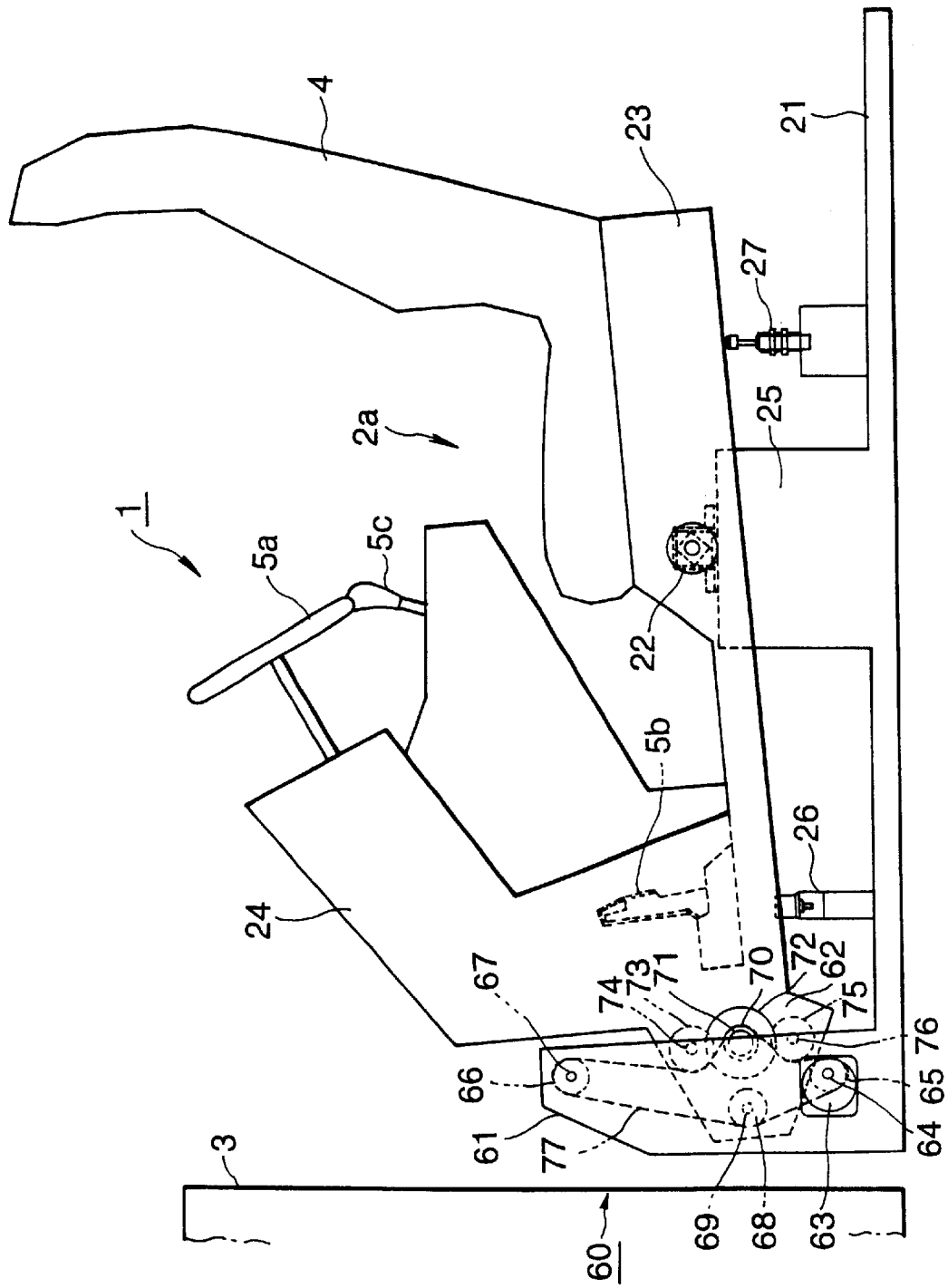
FIG. 16 is a side view of the housing portion of the embodiment of the same game apparatus in a prescribed state of operation.
Figure 17:
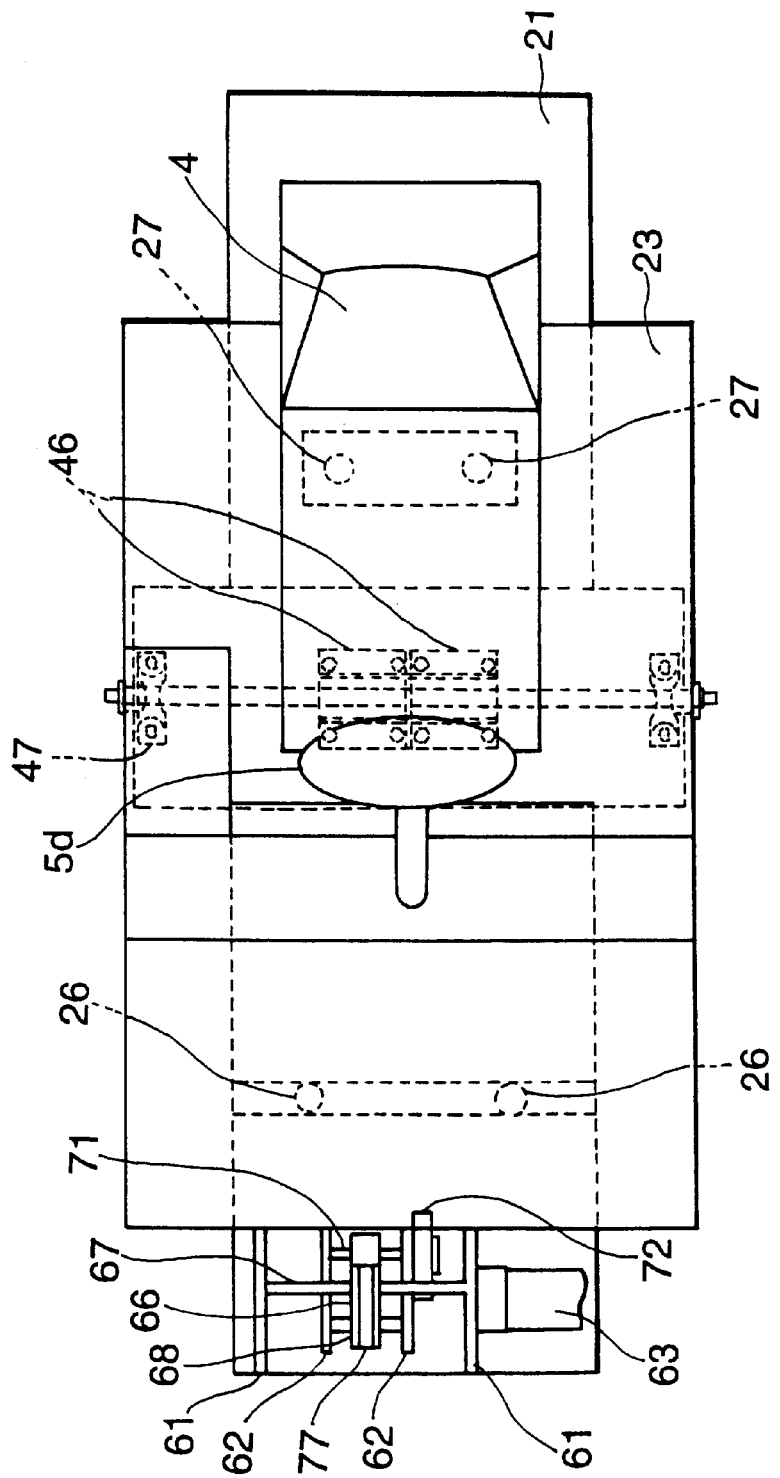
FIG. 17 is a view from above of the housing portion of the game apparatus relating to the present invention.
Figure 18:
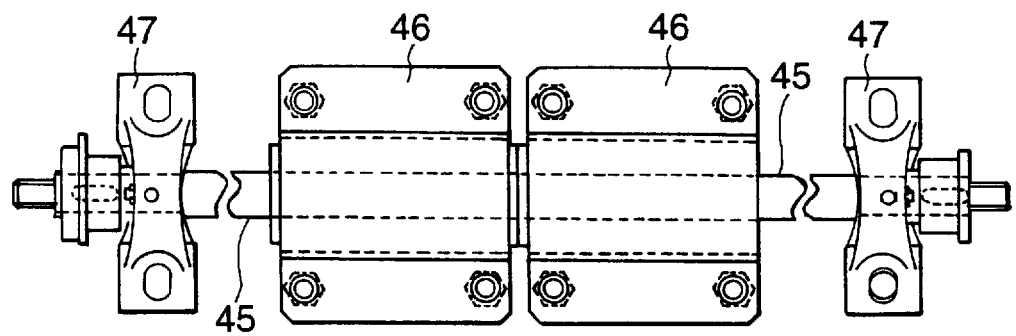
FIG. 18 is a drawing showing a detail of the rotary shaft used in the game apparatus relating to the present invention.
Figure 19:
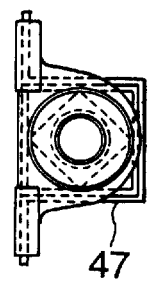
FIG. 19 is a drawing showing a detail of the bearing of the rotary shaft used in the game apparatus relating to the present invention.
Figure 20:
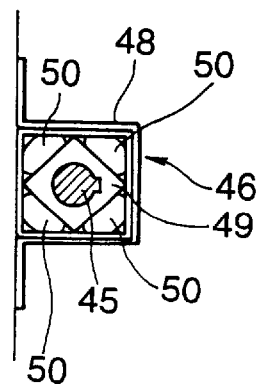
FIG. 20 is a drawing showing a detail of part of the bearing of the rotary shaft used in the game apparatus relating to the present invention.

The mechanisms of this game apparatus are explained using FIGS. 15 through 20. FIG. 15 is a side view showing the housing portion of this game apparatus. FIG. 16 is a side view showing the housing portion of the game apparatus in a prescribed operating state. FIG. 17 is a plane diagram of the housing portion of this game apparatus [viewed from above]. FIG. 18 shows a detail of the motive shaft; FIG. 19 shows a detail of the bearing of the motive shaft; and FIG. 20 shows a detail of part of the bearing of the motive shaft. In these figures, the same symbols are used for elements of the second embodiment which are the same as elements in the first embodiment. In this second embodiment as in the first embodiment, the game apparatus 1 comprises a housing 2a with a form similar to the driver's seat of a car and a display 3 established to the front of the housing 2a.

The second embodiment is a driving game which can provide the experience of forwards or backwards acceleration as generated by acceleration, deceleration, braking, shifting, and jolting, as well as forwards and backwards shaking as if traveling on a bad road, for example. [The second embodiment] is approximately as follows. The abovementioned housing 2a comprises the following: a fixed housing portion 21; a movable housing portion 23, established rotatably on this fixed housing portion 21 by means of a motive shaft 22; and a structural body 24 resembling an engine housing portion established on this movable housing portion 23. A vibration generator 60 is established on one end of this movable housing portion 23. This vibration generator 60 is able to rotate the movable housing portion 23 around the motive shaft 22. This movable housing portion 23 is normally energized by the motive shaft 22 with the front (corresponding to the front of the driver's seat) of the movable housing portion 23 lifted upwards. The seat 4 is established on the rear of the upper side of the movable housing portion 23 and the control apparatus 5 is established on the structural body 24 or the like. Speakers or the like (not shown) are placed inside the abovementioned structural body 24 and in the vicinity of the seat 4. In the second embodiment as well, the abovementioned control apparatus 5 comprises a handle terminal 5a, foot terminal 5b, shift lever 5c, view change switch (not shown), and so forth.

A fixed pedestal 25, whereon the motive shaft 22 is affixed, is located in the central portion of the fixed housing portion 21. A stopper 26 is established to the left of this fixed pedestal 25 in this figure and a shock absorber 27 is established to the left of this fixed pedestal 25 in this figure.

The fixed portion mounting bases 61, 61 of the vibration generator 60 are affixed on one end of this fixed housing portion 21. The movable portion mounting bases 62, 62 of this vibration generator 60 are affixed on one end of the abovementioned movable housing portion 23. The fixed housing portion 21 and movable housing portion 23 are connected by the motive shaft 22 and vibration generator 60. The action of the vibration generator 60 then moves the movable housing portion 23 within a range limited by the stopper 25 and shock absorber 27.

Next, the constitution of the vibration generator 60 is explained. An electric motor 63 is affixed on one of the fixed portion mounting bases 61 in the lower portion of the figure. The rotary shaft 64 of this motor 63 is mounted rotatably on the fixed portion mounting bases 61, 61. A pulley 65 is established on this rotary shaft 64. Also, a rotary shaft 67, whereon a pulley 66 is established, is mounted rotatably on the upper portion of the fixed portion mounting bases 61, 61 as pictured.

A rotary shaft 69, whereon a pulley 68 is established is mounted rotatably on the movable portion mounting bases 62, 62 near the pictured central portion on the left side of this figure. A rotary shaft 71, whereon a pulley 70 is established, is mounted rotatably to the right of this rotary shaft 69 as pictured. This rotary shaft 71 is also used as a rotary shaft for the powder brake 72. A rotary shaft 74, whereon a pulley 73 is established, is mounted rotatably on the movable portion mounting bases 62, 62 above this rotary shaft 71 as pictured. A rotary shaft 76, whereon a pulley 75 is established, is mounted rotatably below this rotary shaft 71 as pictured. A belt 77 passes around the pulleys 65, 68, 66, 73, 70, 75.

The electric motor 63 and powder brake 72 are controlled by the game processing board 10. The electric motor 63 turns forwards and backwards according to commands from the game processing board 10. The powder brake 72 spins when brake command power is not supplied; when brake command power is supplied, [the powder brake 72] generates torque and obstructs the movement of the belt 77. Consequently, when the powder brake 72 works, this obstruction of the movement of the belt 77 turns the movable housing portion 23 in the direction of the movement of the belt 77, if the electric motor 63 is turning.

As shown in FIGS. 18, 19, and 20, the rotary shaft 22 comprises a rotary shaft 45, rosters 46, 46 (trade name for elastic reaction elements) fixed on the side of the movable housing portion 23, and shaft anchors 47, 47 fixed on the movable housing portion 23. The rosters 46 are constituted as shown in FIG. 20. Specifically, an inner square rod 49 is square as seen from the side and smaller than an outer square rod 48. [This inner square rod 49] passes through the outer square rod 48, which is square as seen from the side in FIG. 20, so that the four corners of the inner square rod 49 contact the inner walls of the outer square rod 48. Rubber or other elastic members 50, 50, 50, 50 is placed in the gaps formed between the inner square rod 49 and outer square rod 48. When the abovementioned rotary shaft 22 is fixed on the fixed housing portion 21 and movable housing portion 23, the inner square rod 49 is twisted and applies force to the elastic members 50, 50, 50, 50, whereby the front of the movable housing portion 23 is constantly energized upwards by the restoring force of these elastic members 50, 50, 50, 50.

Figure 21:
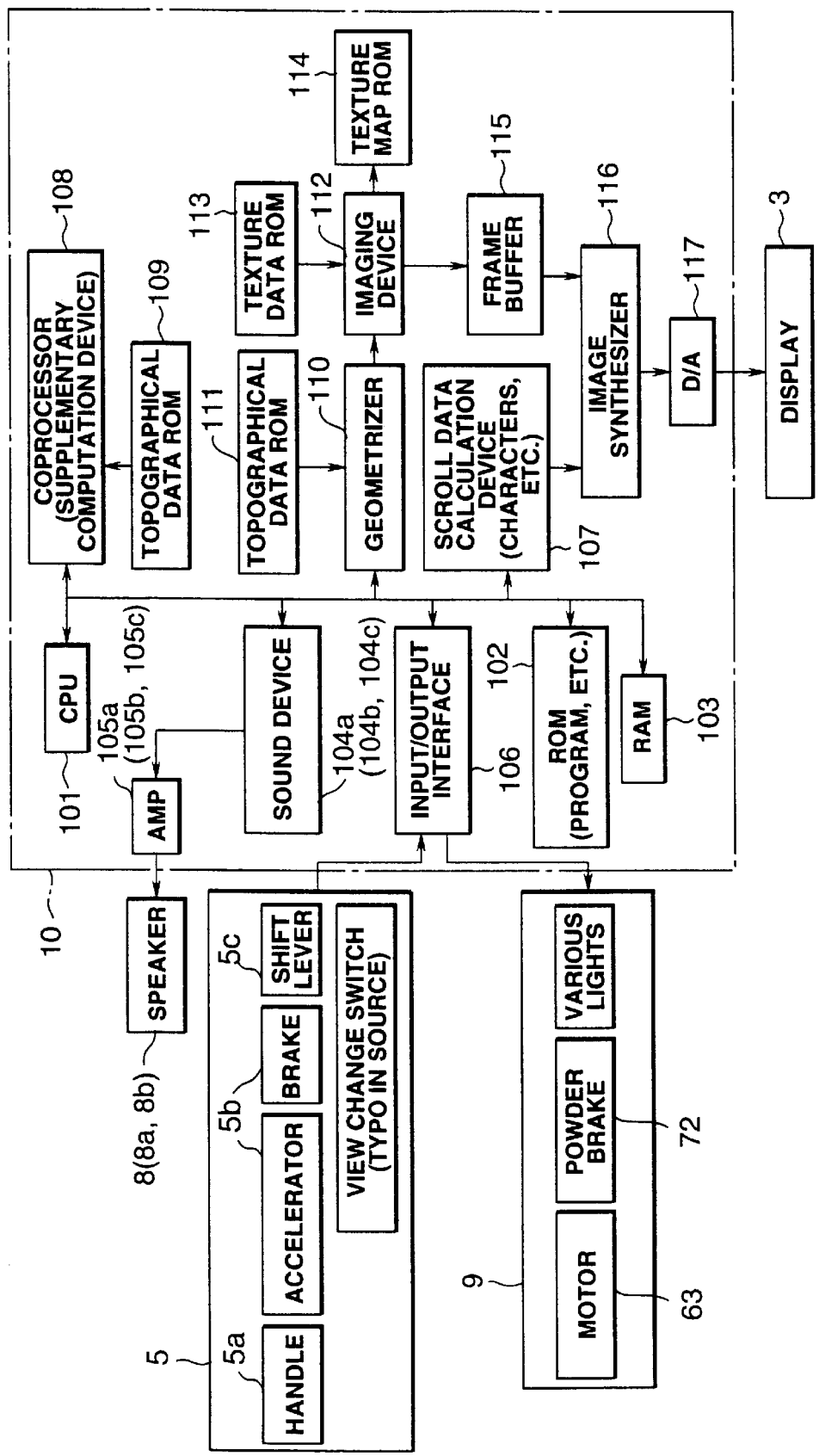
FIG. 21 is a block diagram of the game apparatus relating to the present invention.
Figure 22:
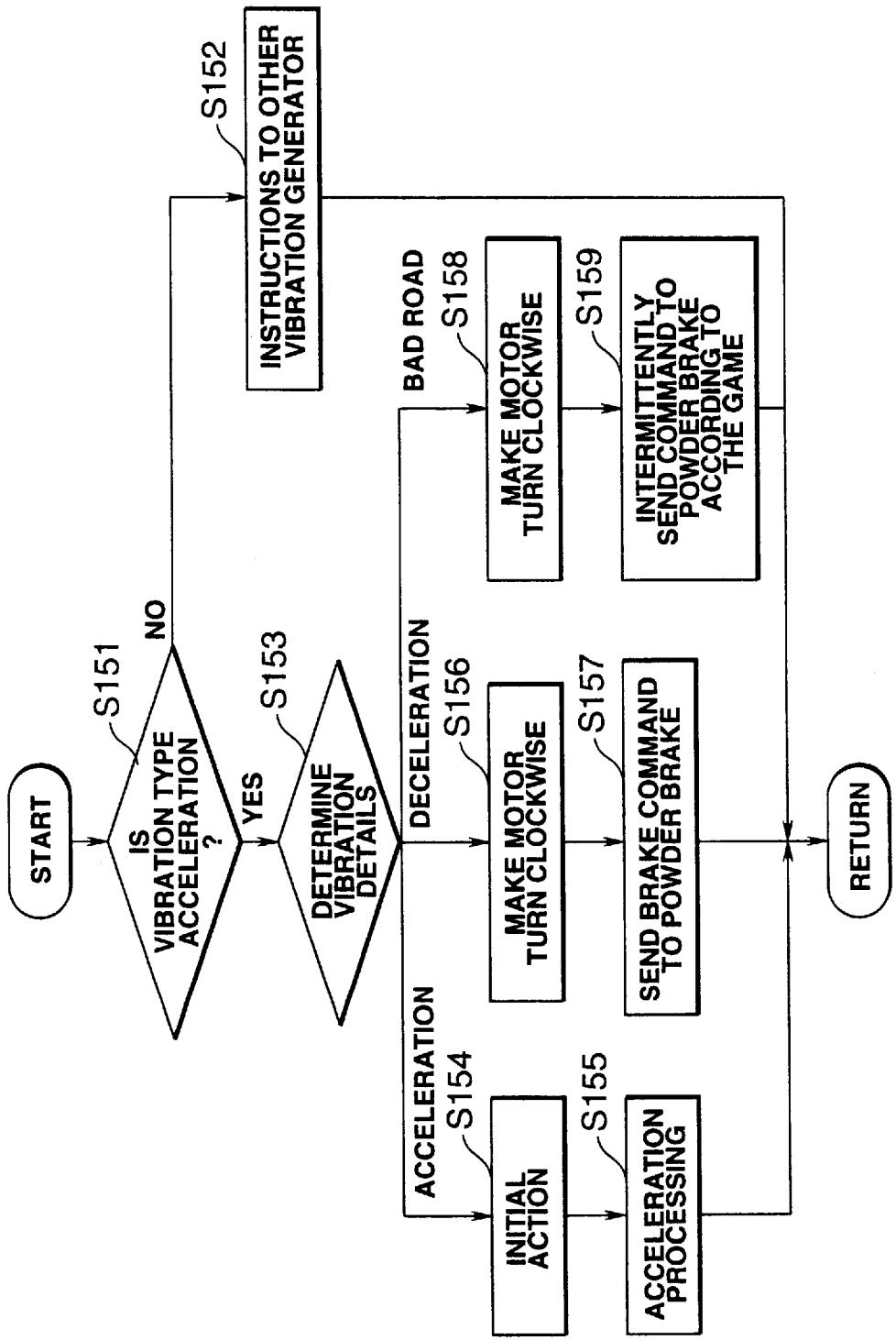
FIG. 22 is a flow chart to explain the operation of the second embodiment of the present invention.

FIG. 21 is a block diagram of the game apparatus relating to the second embodiment. In FIG. 21, the electric motor 63, powder brake 72, and various lights comprise an output apparatus 9a connected to the input/output interface 106 of the game processing board 10, in the second embodiment. The CPU 101 of the game processing board 10 is able to control the direction in which the electric motor 63 rotates according to the progress of the game. The CPU 101 of the game processing board 10 also controls whether the powder brake 72 is worked or not, according to the progress of the game.

Moreover, the game processing apparatus shown in FIG. 21 has the same constitution, excluding the constitution of this output apparatus 9a, as that in the first embodiment.

Subroutine Processing

The operation of the abovementioned second embodiment is explained next.

The movable housing portion 23 is normally in a horizontal state as shown in FIG. 15.

The game is started and the main routine in FIG. 4 is executed, as in the operation of the first embodiment (S1 S7). When vibration generation is detected (FIG. 4 S8: YES), [the process] transfers to the vibration generation command subroutine (see flow chart in FIG. 22) for executing the action in the second embodiment.

In the subroutine in the second embodiment, the vibration type is determined (S151). Here, when the vibration type is not forwards or backwards acceleration occurring with acceleration, deceleration, braking, shifting, jolting, and the like, or forwards or backwards shaking as if traveling on a bad road (S51: NO), then the vibration generation command is provided to another vibration generator (not shown) (S151) and the vibrations are transmitted to the player.

When the vibration type is forwards or backwards acceleration occurring with acceleration, deceleration, braking, shifting, jolting, and the like, or forwards or backwards shaking as if traveling on a bad road (S51: YES), then the vibration details are determined (S153).

Moreover, the cases of controlling vibrations during acceleration and controlling vibrations during deceleration are explained below. An explanation of controlling vibrations during braking, jolting, and the like is omitted. This is because these can be realized using basically the same control methods with only slight differences in the control of the vibrations.

Acceleration

When the vibrations reflect acceleration at startup or the like (S153: Acceleration), the electric motor 63 is caused to turn clockwise as in FIGS. 15 and 16 while providing power to the powder brake 72 (S154). At that point, the belt 77 moves clockwise among the pulleys 65, 68, 67, 73, 70, 75, according to the turning of the electric motor 63. When torque is generated in the powder brake 72, the front of the movable housing portion 23 is moved by the belt 77 towards the stopper 25, so that the front of the movable housing portion 23 contacts the stopper 25. At this time, the torque in the powder brake 72 becomes constant, causing rotation with a prescribed tension applied to the belt 77.

With [the apparatus] in such a state, the electric motor 63 turns counterclockwise in FIGS. 15 and 16 and provides power to the powder brake 72 (S155). Thereupon the belt 77 moves counterclockwise around pulleys 65, 68, 67, 73, 70, 75 according to the turning of the electric motor 63. When torque is generated in the powder brake 72, the front of the movable housing portion 23 is moved upwards by the belt 77. When the front of the movable housing portion 23 is turned beyond a prescribed point, the rear of the movable housing portion contacts the shock absorber 26 and moves no further. At this time, the powder brake 72 has a prescribed torque and becomes able to move the belt 77.

In this way, vibrations during acceleration at startup, and so forth, can be provided to the movable housing portion 23.

Moreover, in this acceleration process, the electric motor 63 turns counterclockwise and provides power to the powder brake 72. The front of the movable housing portion 23 is thereby turned upwards with the belt 77; however, this may also be controlled as follows.

In this acceleration process, the electric motor 63 remains turning in a clockwise direction as in the initial setup action (S154). Cutting the power to the powder brake 72 causes the torque in the powder brake 72 to stop acting on the belt 77; the front of the movable housing portion 23 is turned upwards by the rosters 44, 46 of the rotary shaft 22 being continually energized in a clockwise direction in FIGS. 15 and 16. This situation conserves power because [it works] by cutting the power to the powder brake 72.

Deceleration

When the vibrations reflect acceleration at startup or the like [sic] (S153: Deceleration), the electric motor 63 is turned clockwise in FIGS. 15 and 16 (S156). Thereupon, the belt 77 moves clockwise around the pulleys 65, 68, 67, 73, 70, 75 according to the turning of the electric motor 63. When power is provided to the powder brake 72 (S157), torque is generated in the powder brake 72. Thereupon the front of the movable housing portion 23 is moved towards the stopper 25 by the belt 77. The front of the movable housing portion 23 contacts the stopper 25. At this time, the torque in the powder brake 72 becomes constant and [the brake] can be turned with the belt 77 under a prescribed tension.

In this way, vibrations occurring during acceleration or deceleration, such as upon startup, can be provided to the movable housing portion 23.

Traveling on a Bad (Bumpy) Road

When the vibrations reflect travel on a bad road (S158: Bad road), the electric motor 63 is turned clockwise, for example, in FIGS. 15 and 16 (S158). Thereupon the belt 77 moves clockwise around the pulleys 65, 68, 67, 73, 70, 75 according to the turning of the electric motor 63. Torque is intermittently generated in the powder brake 72 when power is provided intermittently to the powder brake 72 (S159). The front of the movable housing portion 23 is moved by the belt 77 towards the stopper 25 and then returned to the horizontal. This can make the movable housing portion 23 [behave] as if it were traveling on an uneven road.

Changing the interval at which this power is intermittently supplied can vibrate the movable housing portion 23 as if [it were a vehicle] traveling slowly over a short pitched bad road, traveling quickly over a relatively long pitched bad road, or the reverse.

With such a constitution, [the player] can experience the vibrations of forwards or backwards acceleration occurring with acceleration, deceleration, braking, shifting, jolting, and the like, or forwards or backwards shaking as if traveling on a bad road. The game can thereby be realized in a more exciting manner.

Third Embodiment

The third embodiment of the driving game apparatus relating to the present invention is explained with reference to FIG. 23.

Constitution

Figure 23:
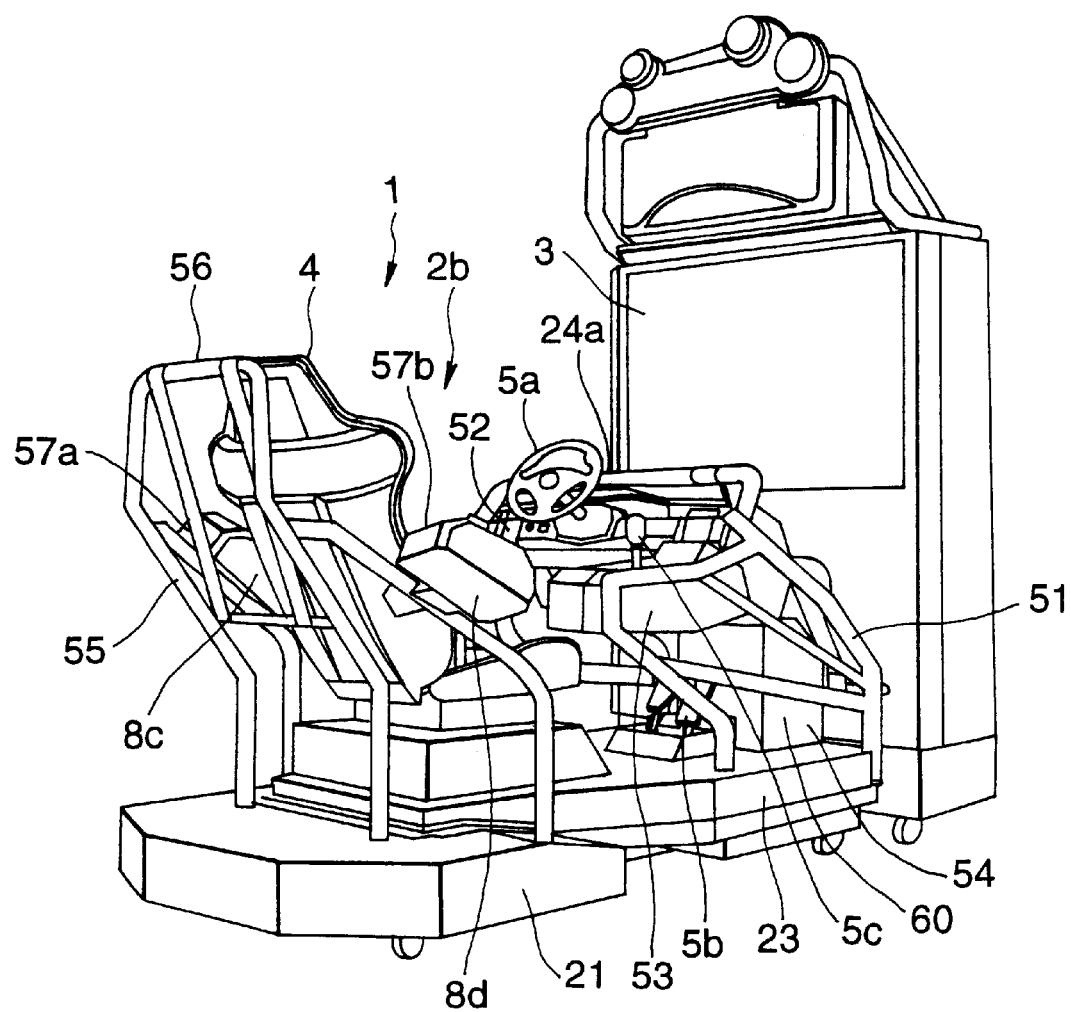
FIG. 23 is a perspective view showing the game apparatus relating to a third embodiment of the present invention.

FIG. 23 is a perspective view showing the third embodiment of this game apparatus. In FIG. 23, the same symbols are used for elements of the third embodiment which are identical to those in the first embodiment and second embodiment. In the third embodiment, as in the first and second embodiments, the game apparatus 1 comprises a housing 2b resembling the driver's seat of a car and a display 3 established in front of this housing 2b.

Figure 13:
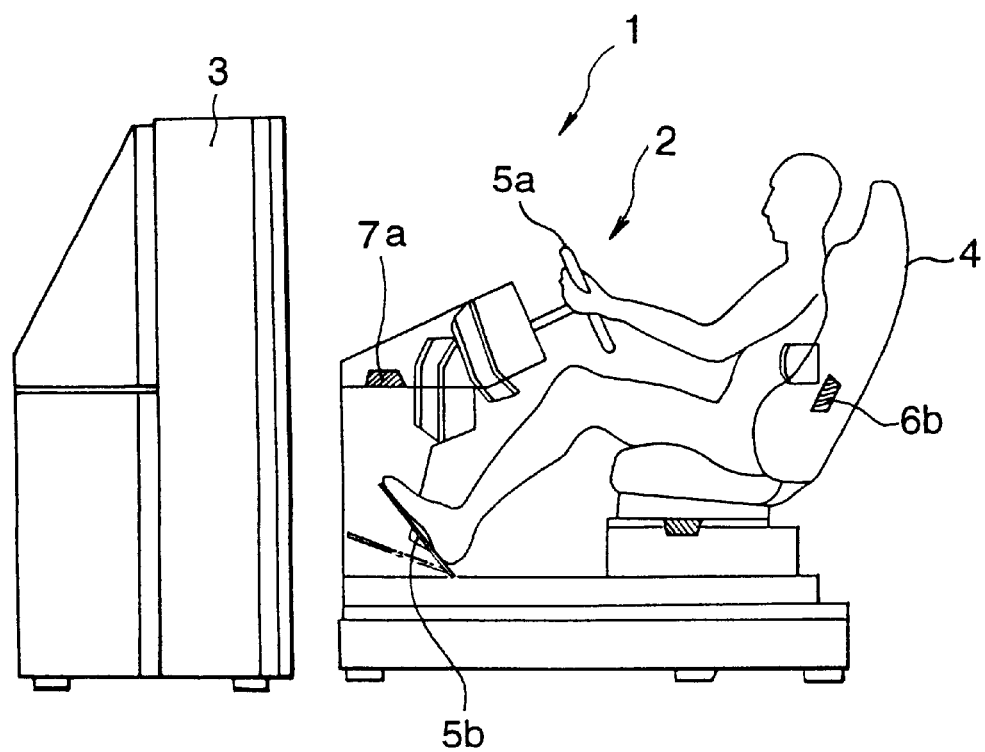
FIG. 13 is a drawing showing a n example of the vibration generator receiving the vibration generation command in the game apparatus relating to the present invention.
Figure 14:
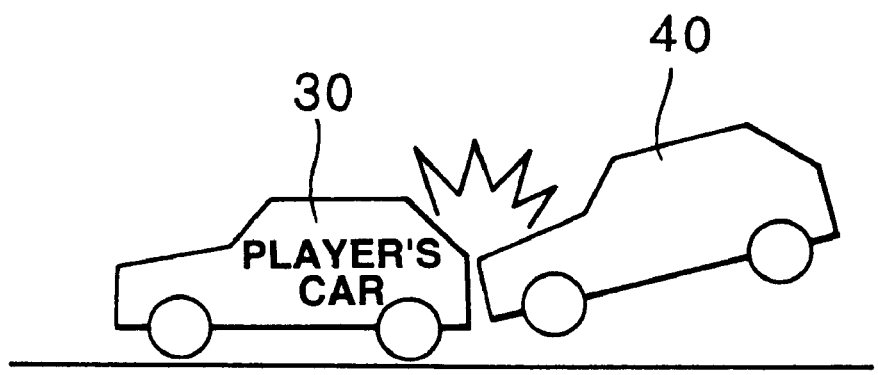
FIG. 14 is a drawing for explaining the operation of the vibration pattern 12 of the game apparatus relating to the present invention.

In the third embodiment, the structural body 24a on the movable housing portion 23, which is the principal structural element of the housing 2c, is made of pipes as shown in FIG. 13. In this third embodiment, the abovementioned housing 2b comprises a fixed housing portion 21, a movable housing portion 23 established rotatably on this fixed housing portion 21 via a rotary shaft 22, and a front structural body 24a established on this movable housing portion 23. A vibration generator is established on one end of this movable housing portion 23; this vibration generator turns the movable housing portion about a rotary shaft. This movable housing portion is continually energized with the rotary shaft so that the front of the movable housing portion (corresponding to the front of the driver's seat) is lifted upwards. Also, the seat 4 is established on the upper rear of this movable housing portion 23. The control apparatus 5 is established on the structural body 24a which is on the upper side of this movable housing portion 23. In this embodiment as well, the control apparatus 5 comprises a handle terminal 5a, foot terminal 5b, shift lever 5c, and view change switch, not shown.

The structural body 24a is made of pipes 51 as shown and affixed on the movable housing portion 23. A dashboard 52 and box 53 for this shift lever 5c are affixed to this structural body 24a comprising the pipes 51. A vibration generator 60 is housed in the box 54 established to the front of the structural body 24a.

A rear structural body 56, formed of pipes 55 and which wraps around the seat 4 as pictured, is arranged on the rear of the fixed housing portion 21. Speaker boxes 57a, 57b, housing speakers 8c, 8d, are affixed to this rear structural body 56.

With this third embodiment, a solid housing can be attained with a simple structure. Moreover, the materials of the housing are economical and can result in a reduced number of manufacturing steps.

Figure 28:
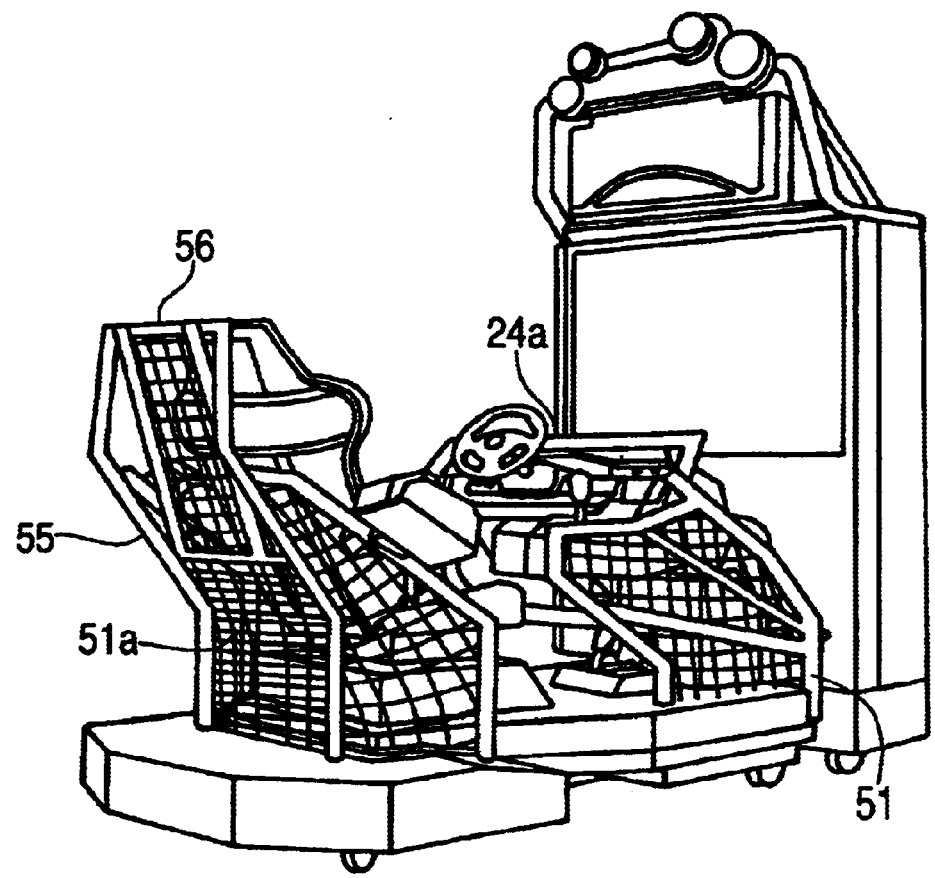
FIG. 28 is a perspective view of the housing relating to the present invention.
Figure 29:
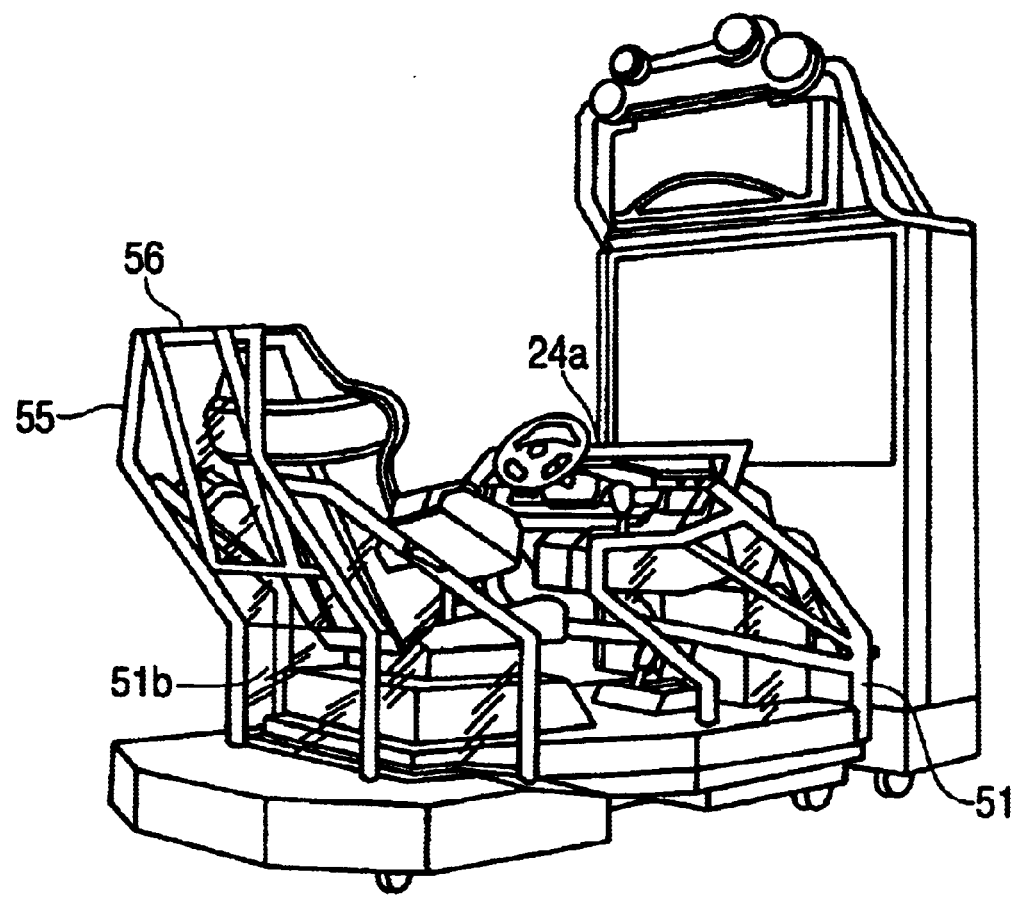
FIG. 29 is a perspective view of the housing relating to the present invention.
Figure 30:
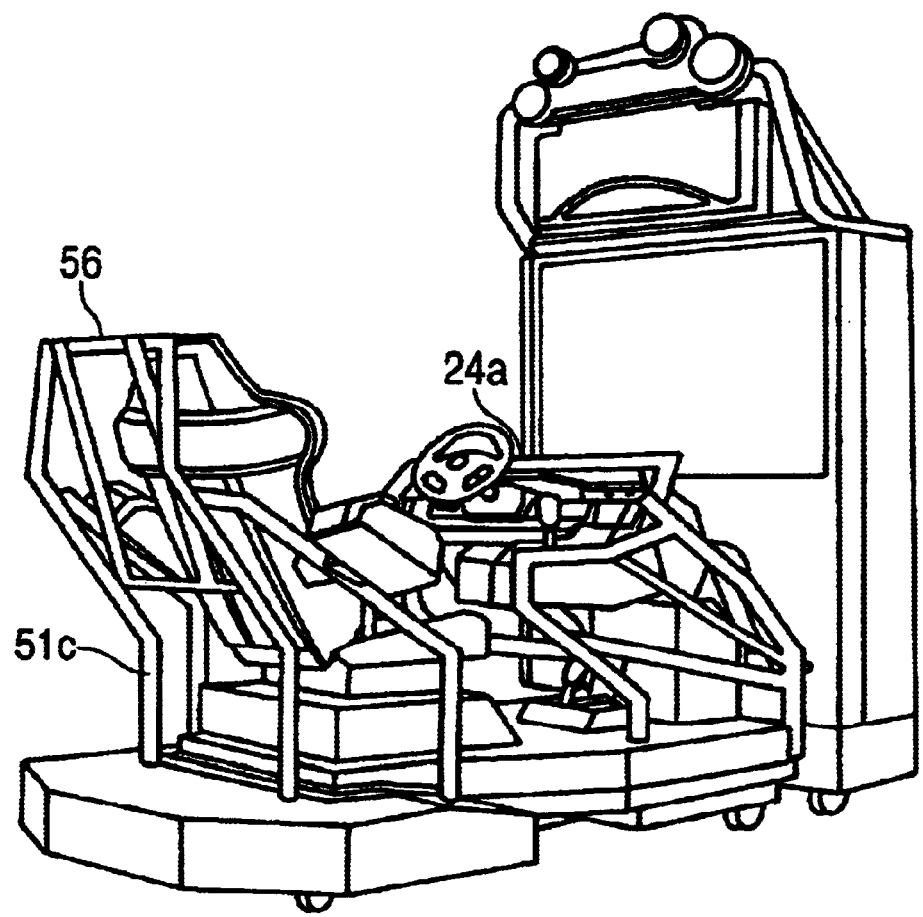
FIG. 30 is a perspective view of the housing relating to the present invention.

As shown in FIG. 28, netting 51*a* may be stretched between the pipes 51 forming the frame for the forward structural body 24*a*, and between the pipes 55 forming the frame for the rear structural body 56. Stretching the netting around the housing where the player sits can provide ambience. Especially for a [road] rally game, stretching netting around the frame of the housing can effectively provide a sense of being in a real vehicle (rally car). As shown in FIG. 29, transparent panels 51*b* may be mounted [on the frame] instead of the netting 5*a*. The transparent panels 51*b* preferably have 100% light transmission, but may be semitransparent or be transparent, but colored. As shown in FIG. 30, the front structural body 24*a* and real structural body 56 may be constituted of flat-sided bodies 51*c* bracing flat panels instead of pipes 51 and pipes 55.

Other

Vibrations can be provided even more colorfully by combining the abovementioned first and second embodiments.

Vibrations can be provided even more colorfully by combining the abovementioned first, second, and third embodiments; in addition, a solid housing can be attained with a simple structure. Moreover, the materials of the housing are economical and can result in a reduced number of manufacturing steps.

INDUSTRIAL APPLICABILITY

As explained above, the game apparatus relating to the present invention [provides] a game machine for executing a game program displayed on a screen which simulates vibrations generated by displayed bodies in a state of movement for the player operating the game machine. The player can therefore realistically experience the situations as the game progresses.

The game apparatus relating to the present invention performs prescribed processes according to the program, while creating vibration generation commands according to the game processing; [the game apparatus] then generates vibrations with vibration generators based on those vibration generation commands. The player can therefore realistically experience the situations as the game progresses.

Furthermore, the game apparatus relating to the present invention provides vibrations to the control apparatus with vibration generators for generating vibrations according to the game program. Vibrations of the display relating to the progress of the game are therefore transmitted to the player via [the area] nearby the control apparatus and can provide a more realistic experience.

The game apparatus relating to the present invention also can turn the movable housing portion in relation to the fixed housing portion by means of a rotary shaft and provide turning force such as vibrations to the movable housing portion with the vibration generators. The game is therefore made more exciting because [the player] can experience the vibrations of forwards or backwards acceleration occurring with acceleration, deceleration, braking, shifting, jolting, and the like, or forwards or backwards shaking as if traveling on a bad road (including slopes, pitching (inclination of the vehicle to the front or back)).

The game apparatus relating to the present invention also can have a strong housing with a simple structure with the forward structural body and rear structural body composed of pipes. Moreover, the materials of the housing are economical and can result in a reduced number of manufacturing steps. This can provide the housing for a game apparatus resembling a real rally car. At the same time, the structural bodies being pipes allows [viewers] outside to more easily observe the player s operations of the control apparatus, such as the pedals and handles. This improves the ambience for the people observing the player operating the game machine.

The game apparatus relating to the present invention can firmly transfer vibrations to the player; this can make the game more interesting.

What is claimed is:

1. A game apparatus for displaying objects on a screen comprising:

a game processing unit for executing prescribed game processing according to a game program and outputting a plurality of vibration generation commands each corresponding to a condition of the game processing;

a housing comprising a player accommodation portion and a control apparatus portion for inputting operation commands to change the condition of the game processing; and a plurality of vibration generators comprising a first vibration generator placed at a front end of the housing, generating a vibration, according to a first one of the vibration commands corresponding to a first game condition; and a second vibration generator placed at a rear end of the housing, generating a vibration, according to a second one of the vibration commands corresponding to a second game condition, wherein at least one of said plurality of vibration generators comprises a vibration source, and a vibration panel being communicably connected to said vibration source, one end of said vibration panel being affixed to a part of the housing subject to vibration and the other end of said vibration panel being free.

2. The game apparatus according to claim 1, wherein said vibration panel comprises a reinforcing member extending from said vibration panel to said part of the housing.

3. The game apparatus according to claim 1, wherein said vibration source is a low frequency acoustic vibration source.

4. The game apparatus according to claim 1, wherein said housing comprises a seat for accommodating the player, said seat having a bottom portion and a back portion, and one or more of said plurality of vibration generators being placed on at least one of said bottom portion and said back portion.

5. The game apparatus according to claim 1, wherein said housing comprises a control apparatus for inputting the operation commands, said control apparatus having a hand terminal and a foot terminal, and one or more of said plurality of vibration generators being placed on at least one of said hand terminal and said foot terminal.

6. The game apparatus according to claim 1, wherein said game processing unit simulates a movement of a virtual object controlled by the player and selects at least one of the vibration generation commands corresponding to the movement of the virtual object.

7. The game apparatus according to claim 6, wherein said game processing unit determines the movement of the virtual object representing a virtual vehicle and selects the generation commands for generating vibration caused by the movement of the virtual vehicle, the movement being selected from one of jumping at a rise on a virtual road, passing over a bump on the virtual road, braking, drifting, slipping rear wheels of the virtual vehicle, colliding with an object in front of the virtual vehicle, and being struck from behind by another object.

8. The game apparatus according to claim 1, wherein said housing comprises a rotatable seat.

9. The game apparatus of claim 1, wherein at least one of the plurality of vibration generators is placed within the player accommodation portion.

10. The game apparatus of claim 6, wherein the first game condition comprises the front of the virtual object coming into contact with a second virtual object.

11. The game apparatus of claim 6, wherein the second game condition comprises the rear of the virtual object coming into contact with a second virtual object.

12. The game apparatus of claim 6, wherein the game processing unit outputs the first vibration command upon encountering the first game condition, and outputs the second vibration command upon encountering the second game condition.

13. A game apparatus for displaying objects on a screen, said game apparatus comprising:
   a stationary fixed housing portion;
   a movable housing portion rotatably secured to said fixed housing portion via a shaft, said shaft comprising means for exerting a force to rotate said movable housing portion in a selected direction;
   a foot terminal, mounted in said movable housing portion, for controlling movement of a virtual vehicle within a virtual space;
   a vibration generator for simulating the movement of the virtual vehicle and applying to said movable housing portion a vibration on the basis of a situation of the virtual vehicle operated within the virtual space, said vibration generator comprising:
      a motor for generating a rotational torque according to movement of the virtual vehicle,
      a main pulley mechanically coupled to said foot terminal,
      an auxiliary pulley, and
      a belt coupling said main pulley, said auxiliary pulley, and said motor for transmitting the rotational torque generated by said motor, wherein the rotational torque generated by said motor causes the movable housing portion to rotatably move about the shaft in the selected direction, such that a motion of the movable housing corresponds to a movement of said virtual vehicle.

14. The game apparatus according to claim 13 further comprising:
   a front structural body disposed at front end of said movable housing portion; and
   a rear structural body disposed at a rear end of said fixed housing portion.

15. The game apparatus according to claim 14, wherein said front structural body comprises a dashboard and a control apparatus used by a player and said rear structural body comprises speakers.

16. The game apparatus according to claim 14, wherein at least one of said front structural body and said rear structural body comprises a frame structure formed of either round pipes or flat-sided pipes.

17. The game apparatus according to claim 16, wherein said frame structure is covered with either a net or transparent panels.

18. The game apparatus of claim 13, wherein the movement of the virtual vehicle comprises a movement selected from a group consisting of: an acceleration, a deceleration, a braking, a shifting, a jolting, and a movement along a bumpy road.

* * * * *